YARN SIZING APPARATUS FOR SLASHERS AND METHOD

Filed March 13, 1953 13 Sheets-Sheet 1

IRA L. GRIFFIN,
INVENTOR.

BY Eaton & Bell
ATTORNEYS

Jan. 11, 1955 I. L. GRIFFIN 2,698,985

YARN SIZING APPARATUS FOR SLASHERS AND METHOD

Filed March 13, 1953 13 Sheets-Sheet 2

INVENTOR:
IRA L. GRIFFIN

BY Eaton + Bell

ATTORNEYS

Jan. 11, 1955 I. L. GRIFFIN 2,698,985

YARN SIZING APPARATUS FOR SLASHERS AND METHOD

Filed March 13, 1953 13 Sheets-Sheet 3

IRA L. GRIFFIN,
INVENTOR.

BY Eaton & Bell

ATTORNEYS

YARN SIZING APPARATUS FOR SLASHERS AND METHOD

Filed March 13, 1953 13 Sheets-Sheet 4

IRA L. GRIFFIN,
INVENTOR.

BY Eaton + Bell

ATTORNEYS

IRA L. GRIFFIN,
INVENTOR.

BY Eaton + Bell
ATTORNEYS

YARN SIZING APPARATUS FOR SLASHERS AND METHOD

Filed March 13, 1953

INVENTOR:
IRA L. GRIFFIN.

BY Eaton & Bell

ATTORNEYS

Jan. 11, 1955 I. L. GRIFFIN 2,698,985

YARN SIZING APPARATUS FOR SLASHERS AND METHOD

Filed March 13, 1953 13 Sheets-Sheet 7

INVENTOR:
IRA L. GRIFFIN

BY Eaton + Bell

ATTORNEYS

IRA L. GRIFFIN,
INVENTOR.

BY Eaton & Bell

ATTORNEYS

INVENTOR:
IRA L. GRIFFIN

BY Eaton + Bell
ATTORNEYS.

IRA L. GRIFFIN,
INVENTOR.

BY Eaton + Bell
ATTORNEYS.

Jan. 11, 1955 I. L. GRIFFIN 2,698,985

YARN SIZING APPARATUS FOR SLASHERS AND METHOD

Filed March 13, 1953 13 Sheets-Sheet 11

INVENTOR:
IRA L. GRIFFIN

BY Eaton + Bell

ATTORNEYS

Jan. 11, 1955 I. L. GRIFFIN 2,698,985

YARN SIZING APPARATUS FOR SLASHERS AND METHOD

Filed March 13, 1953 13 Sheets-Sheet 12

IRA L. GRIFFIN,
INVENTOR,

BY Eaton + Bell

ATTORNEYS

Jan. 11, 1955 I. L. GRIFFIN 2,698,985

YARN SIZING APPARATUS FOR SLASHERS AND METHOD

Filed March 13, 1953 13 Sheets-Sheet 13

IRA L. GRIFFIN,
INVENTOR.

BY Eaton & Bell

ATTORNEYS

United States Patent Office 2,698,985

Patented Jan. 11, 1955

2,698,985

YARN SIZING APPARATUS FOR SLASHERS AND METHOD

Ira L. Griffin, Charlotte, N. C.

Application March 13, 1953, Serial No. 342,199

32 Claims. (Cl. 28—28)

This invention generally relates to the art of sizing textile strands and, more especially, to an improved size box for slashers.

It is the primary object of this invention to provide an improved arrangement of rolls in a size box wherein an immersion roll of relatively large diameter bears against a driven lower squeeze roll of relatively smaller diameter, upon and in engagement with which an upper squeeze roll is provided. The diameters of the immersion roll and the lower squeeze roll are such that the axes thereof are spaced substantially above the sizing solution and the yarns are directed to the immersion roll in such a manner that they fully engage the immersion roll before entering the sizing solution in which the lower portion of the immersion roll is immersed. The nip of the immersion roll and the lower squeeze roll is disposed substantially diameterically opposite the point at which the yarns initially contact the immersion roll, thus providing an air escape space between the level of the sizing solution and the nip or contact point of the immersion roll and the lower squeeze roll thereby insuring that air is exhausted from the yarns at the nip of the immersion roll and the lower squeeze roll as the excess sizing solution is squeezed from the yarns. Since the yarns are in snug contact with the periphery of the immersion roll and the immersion roll is driven by contact with the lower squeeze roll at the point at which the yarns pass between the immersion roll and the lower squeeze roll, the yarns are thereby pulled from the creel beams under a minimum amount of tension in the wet state.

Another advantageous feature of this particular arrangement of the rolls of the size box is the valley formed above the nip of the immersion roll and the lower squeeze roll wherein means are provided to direct sizing solution to said valley and to maintain the sizing solution at such a level as to again immerse the yarns after the air has been exhausted therefrom at the nip of the immersion roll and the lower squeeze roll, thereby insuring that the sizing solution thoroughly penetrates each of the yarns. This also prevents any film formation due to evaporative cooling and eliminates the possibility of the size congealing in the form of hard chunks on the yarns when the slasher is stopped for the repair of imperfect winding of yarn on the beams, or in the case of taking leases, changing beams or making minor repairs or adjustments of the slasher and its operating accessories.

It is another object of this invention to provide a size box having an arrangement of rolls of the character described and wherein the tank or container for the sizing solution is closed and provided with an insulated partition forming the container or tank into two compartments, namely, an active or operating compartment, in which the lower portions of the immersion roll and the lower squeeze roll are disposed, and an inactive or storage compartment. Both of the compartments have substantially the same liquid capacity. The insulated partition is provided with an aperture through which excess sizing solution in the operating compartment overflows into the storage compartment thereby insuring that the sizing solution in the operating compartment does not cause the lower portions of the immersion roll and the lower squeeze roll to be excessively immersed and, further, insuring that the sizing solution will not overflow the openings in the tank through which the immersion roll shaft extends.

It is still another object of this invention to provide an apparatus of the character last described with manually controlled means for pumping the sizing solution from either compartment into the other of the compartments. This has many advantages over other size boxes heretofore in use, particularly as to savings in the sizing solution. For example, in many textile plants, the sizing solution is drained from the size box tank and runs into the usual sewer each time the yarns are changed, which is normally termed as a change of yarn sets. Currently, a normal yarn set of print cloth construction embodying number 30's single yarn is approximately thirty thousand yards long and, at the current high speed processing operations, a yarn set of this type will be sized in approximately eight hours. At the end of each set, the tanks of the size boxes are usually drained and it is necessary to wash the rolls and boil out the boxes thoroughly in order to remove all of the congealed sizing material and to thereby prevent its re-incorporation in the new sizing solution.

If the original sizing solution were allowed to remain in the tank of the size box without the agitation caused by rotation of the immersion roll and the squeeze rolls, and, if the size box tank was not substantially closed, the remaining sizing solution would congeal and form a film on all parts contacted thereby in the tank of the size box, due to evaporative cooling and the change of density due to evaporation. The storage compartment of the improved size box tank is completely enclosed and, thus, at the end of each set, the sizing solution may be pumped from the operating compartment into the storage compartment and will be maintained at a suitable temperature to avoid any congealing, film formation or change in density. The sizing solution may be stored in the storage compartment for the time required to place a new set of creel beams in position and to perform any other necessary operations in the arranging of a new set of yarns preparatory to the slasher again being started.

Also, during the period in which the sizing solution is disposed in the storage compartment, all of the rolls and the complete operating compartment of the tank of the size box may be thoroughly washed and rinsed so as to avoid any possibility of congealed sizing solution or film formations being incorporated when operation is subsequently resumed. When the next set of yarns has been properly threaded past the rolls of the size box, the sizing solution may then be pumped from the storage compartment into the operating compartment without any loss of time or without any loss of sizing material.

It is evident that this will result in considerable savings in view of the fact that the usual size box tank contains approximately fifty gallons of sizing solution, which is currently valued at a minimum of ten cents per gallon. In the case of sizing material, such as gelatin or some types of synthetic resins, the value per gallon may be as much as four or five dollars.

It is still another object of this invention to provide means for pumping the sizing solution into the valley formed above the nip of the lower squeeze roll and the immersion roll and wherein opposite ends of the valley are closed by movable closure members. The walls forming opposite ends of the valley are disposed within the tank of the size box so that sizing solution can be directed into the valley and will overflow the end walls of the valley, thus insuring that the sizing solution is constantly in motion. This facilitates the use of different types of sizing solutions in a size box tank. For example, a different type of sizing solution from that present in the operating compartment may be stored in the storage compartment and then, in the instance of sizing relatively expensive synthetic yarns, the sizing solution may be pumped from the storage compartment into the valley between the immersion roll and the lower squeeze roll and maintained at a level such as to insure that the sheet of yarns in process is completely immersed in advance of its passing through the nip of the top and bottom squeeze rolls.

The sizing solution directed into said valley would be constantly in motion and would overflow at least one of the end walls of the valley and would subsequently fall into the sizing solution presently in the tank of the size box to mix therewith, thereby preventing any film formation due to evaporative cooling and making is impossible for hard size to form when the slasher is stopped for the repair of imperfect winding and for other purposes.

Of course, in the event of the sizing solution directed to said valley being of such character as to be incompatible with the solution previously present in the operating compartment of the tank of the size box, the sizing solution in the operating compartment of the size box could be pumped out of the operating compartment immediately before the sizing solution from the storage compartment is pumped into the valley.

One of the important features of the present invention is the particular manner in which the immersion roll is arranged relative to the sizing solution in the operating compartment and the lower squeeze roll, wherein the yarns remain in contact with the immersion roll from the time immediately preceding the time at which it passes into the sizing solution until after it has again passed out of the sizing solution at the nip of the immersion roll and the lower squeeze roll. This insures that the yarns are held in the same parallel position throughout their movement through the size box and eliminates the possibility of grouping, taping, or rolling of the yarns as is prevalent in conventional size boxes.

It is still another object of this invention to provide a size box of the character described wherein the tank of the size box is completely enclosed with the exception of the points at which the yarns pass into and out of the size box tank and wherein a fan, preferably of the centrifugal type, is provided, adjacent the path of travel of the yarns as they leave the tank of the size box, which directs a continuous gentle current of air into and through the tank and outwardly through the opening through which the yarns pass as they enter the tank of the size box. This fan is provided for the purpose of diverting the steam and vapors caused by evaporation of solution from the sheet of yarns as it leaves the size box thereby eliminating condensation on edges of the egress opening of the size box tank. Also, as the air is exhausted through the yarn ingress opening, it preheats the yarns so they will have a greater affinity for the sizing solution as they subsequently pass beneath the immersion roll. This also minimizes the amount of steam required to maintain the sizing solution at the proper temperature.

Some of the objects of the invention having been stated, other objects will appear as the description proceeds, when taken in connection with the accompanying drawings in which—

Figure 1:
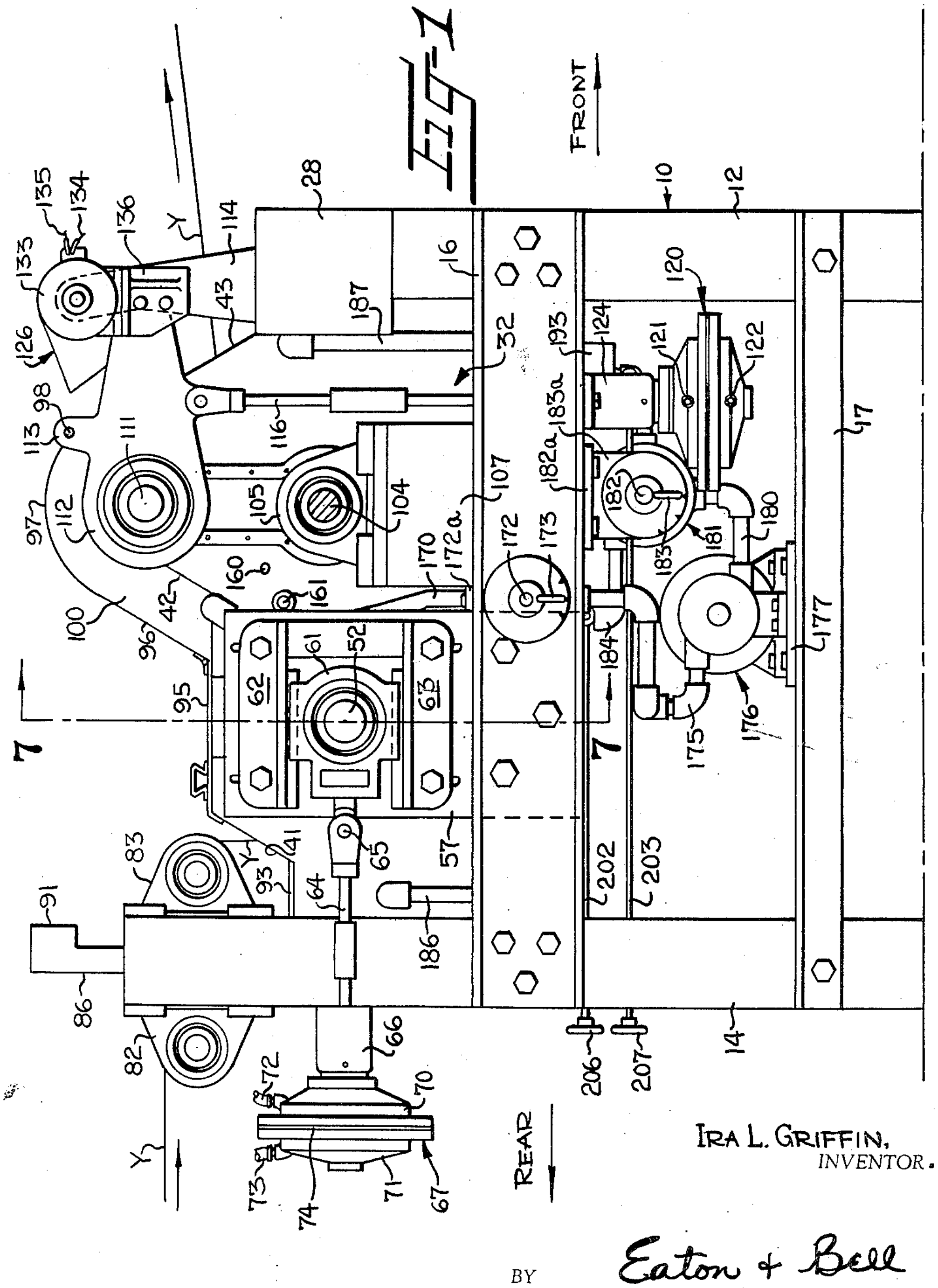
Figure 1 is a left-hand side elevation of the improved size box wherein the drive shaft therefor is shown in cross-section.
Figure 2:
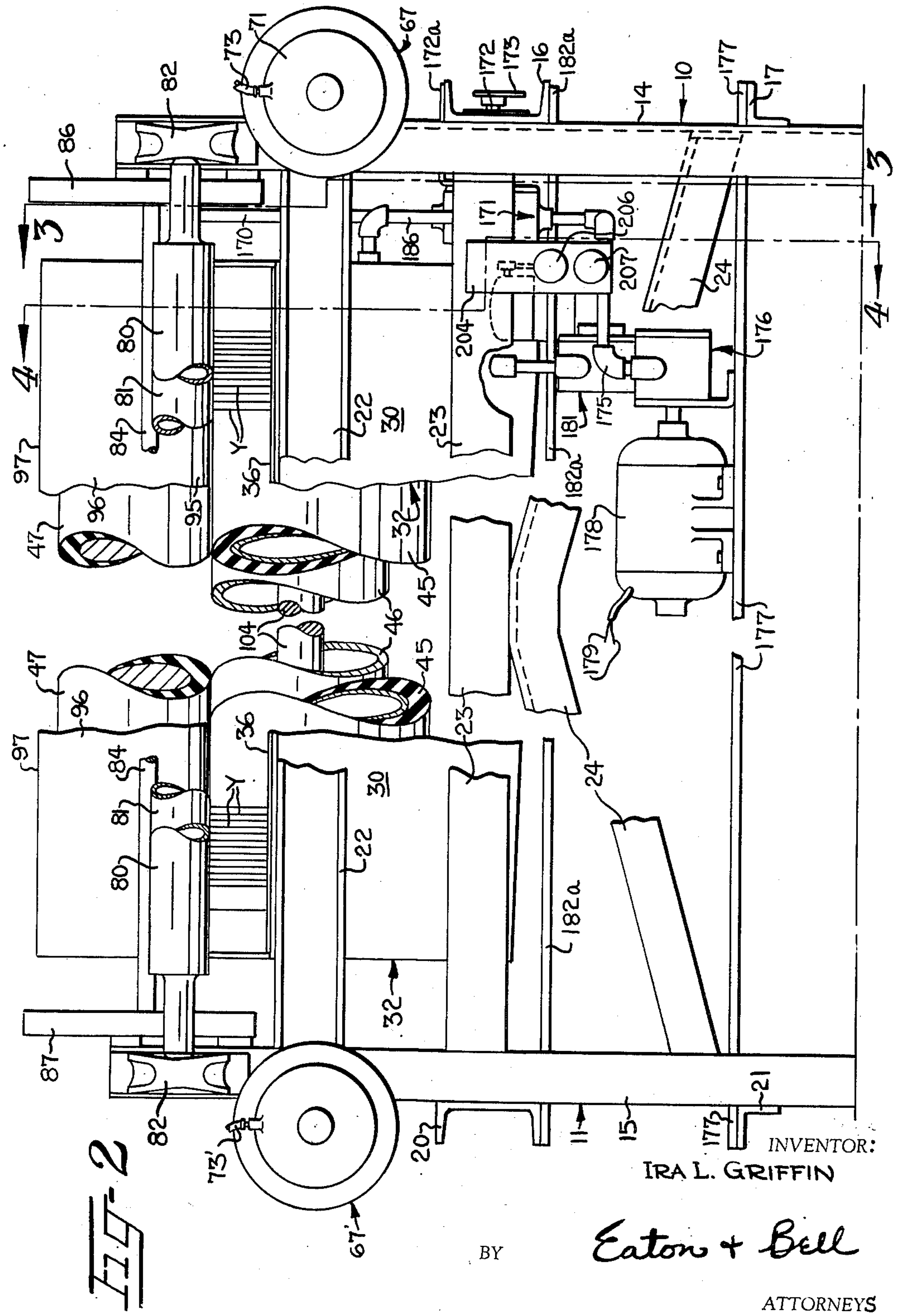
Figure 2 is a rear elevation of the improved size box with portions broken away and looking at the left-hand side of Figure 1.

Referring more specifically to the drawings, the numerals 10 and 11 broadly designate respective right-hand and left-hand side frame members which include respective front and rear legs or corner posts 12, 13 and 14, 15. The corner posts 12, 14 are bridged by upper and lower longitudinal frame members 16, 17 suitably secured thereto. Suitably secured to, and bridging the distance between, the legs 13, 15 are respectively upper and lower longitudinal frame members 20, 21 (Figures 2, 3, 4, 5 and 6).

Suitably secured to, and spanning the distance between, the rear legs or corner posts 14, 15 are respective upper, intermediate and lower transverse frame members 22, 23, 24 and similar transverse frame members 25, 26, 27 are provided at the front of the machine. It will be noted that the upper front transverse frame member 25 is fixed at opposite ends thereof to blocks or brackets 28, 29 suitably secured to the upper ends of the front legs 12, 13 and opposite ends of the frame members 26, 27 are suitably secured to the legs 12, 14. In the drawings the lower transverse frame members 24, 27 are shown as being of inverted V-shaped or arcuate construction with the central portions thereof being suitably secured to the lower surfaces of the respective intermediate transverse frame members 23, 26.

The upper transverse frame members 22, 25, support the flanged upper edges of respective rear and front walls 30, 31 of a size box tank broadly designated at 32. Although the upper edges of the rear and front walls 30, 31 are disposed on substantially the same level, it will be noted, in Figures 3 and 4, that the front wall 31 is of substantially greater vertical length than the rear wall 30 and the lower ends of the walls 30, 31 are formed integral with an inclined bottom wall 33. The walls 30, 31, 33 are preferably suitably insulated on the exterior surfaces thereof since the sizing material S disposed within the tank 32 must be maintained at relatively high temperatures. The tank 32 also includes opposite side walls 34, 35 whose upper edges are irregularly and correspondingly shaped as is most clearly shown in Figures 3 and 4.

In this instance, each of the side walls 34, 35 is formed with stepped upper edges disposed at progressively higher elevations from the rear to the front of the machine and which are indicated at 36, 37 and 38. The steps 36 and 37 are connected by inclined rear edges 41, the steps 37 and 38 are connected by inclined rear edges 42 and the uppermost edge portions 38 are connected to the upper edges of the front wall 31 by downwardly and forwardly inclined edges 43.

Disposed within the size box tank 32 is a rubber covered or resilient material covered immersion roll 45 of relatively large diameter, particularly as compared to immersion rolls heretofore in use, and which normally engages a seamless, preferably stainless, steel lower squeeze roll 46. In turn, the upper surface of the lower squeeze roll 46 is engaged by a rubber covered upper squeeze roll 47. Throughout the specification wherever the term "rubber covered" is employed with respect to the immersion roll 45 and the upper squeeze roll 47, this is to be construed as a general term, since is is evident that various types of resilient covering or rubber composition may be adhesively applied to the walls of the corresponding rolls 45 and 47.

The immersion roll 45 is preferably disposed on substantially the same level as, or slightly lower than, the level of the axis of the relatively smaller lower squeeze roll 46 and is shown as being of tubular construction as indicated by the tubular metal wall 50. Opposite ends of the tubular wall 50 are suitably closed as by head members 51 (Figures 4 and 7), which head members are fixed on a transverse shaft 52. Each of the side walls 34, 35 of the size box tank 32 is provided with a longitudinally extending slot 53 which is disposed substantially above the normal level of the sizing solution S and through which the corresponding end portions of the shaft 52 extend. In order to facilitate positioning the immersion roll 45 within the tank 32, each of the side walls 34, 35 has a vertically extending slot 54 therein extending from the corresponding stepped upper edge 37 to the opening 53 and each of the slots 54 is normally closed by a closure member 55 suitably removably secured to the corresponding walls 34, 35.

Figure 7:
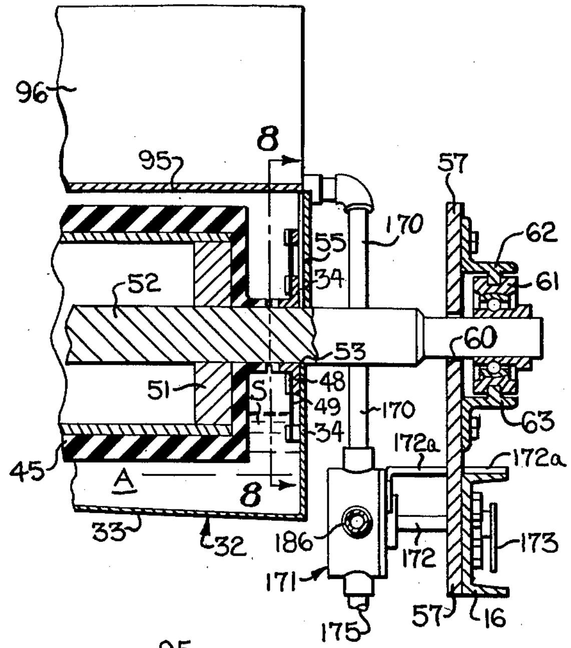
Figure 7 is a fragmentary vertical sectional view taken substantially along the line 7—7 in Figure 1.
Figure 8:
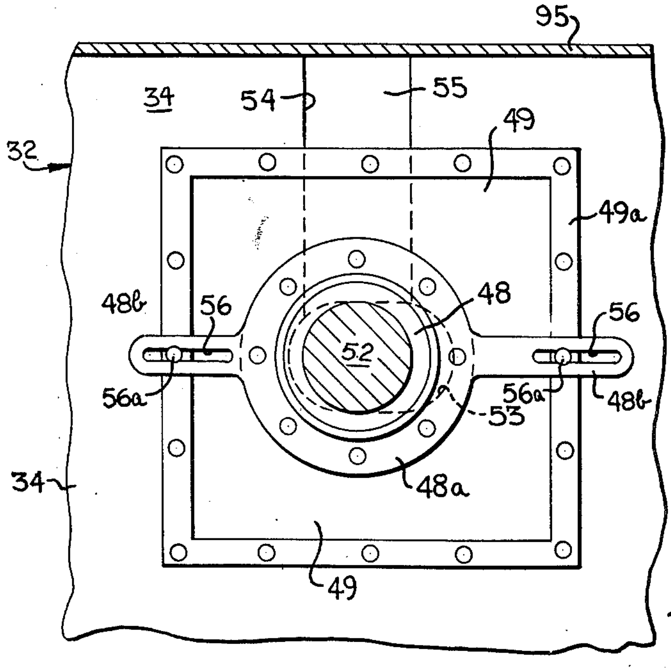
Figure 8 is an enlarged fragmentary detail taken substantially along the line 8—8 in Figure 7.

Since the shaft 52 is movable horizontally relative to the side walls 34, 35 of the size box tank 32, means are provided to maintain a seal between the shaft 52 and said walls 34, 35 which is best shown in Figures 7 and 8. Although the level of sizing solution S in the tank 32 is usually substantially below the level of the shaft it is found best to provide a seal therearound to prevent the sizing solution from bubbling out of the slots 53. Since this sealing means may be the same at both of the walls 34, 35, only the structure associated with the wall 34 is shown and will be described in detail.

The shaft 52 slidably penetrates a collar 48, the hub of which penetrates substantially the central portion of a substantially rectangular sealing plate 49 made from a resilient material, such as rubber. The resilient plate 49 is suitably secured to the inner surface of the wall 34 of the size box tank 32 and is held in position by a substantially rectangular framework 49a fixed to the side wall 34. The resilient plate 49 is fixed to the collar 48 by means of a ring 48a which engages the opposite surface of the resilient plate 49 from that which is engaged by the flanged portion of the collar 48, and the ring 48a has a pair of substantially diametrically opposed arms 48b integral therewith which are longitudinally slotted, as at 56, for the reception of corresponding studs 56a (Figure 8).

It is thus seen that, as the shaft 52 is moved back and forth in the corresponding slots 53, by means to be later described, the ring 48a and the collar 48 move therewith, said ring 48a being guided on the studs 56a. The resilient plate 49, being of a stretchable material, will thus permit relative movement between the wall 34 and the shaft 52 while maintaining a liquid seal therebetween.

Figure 5:
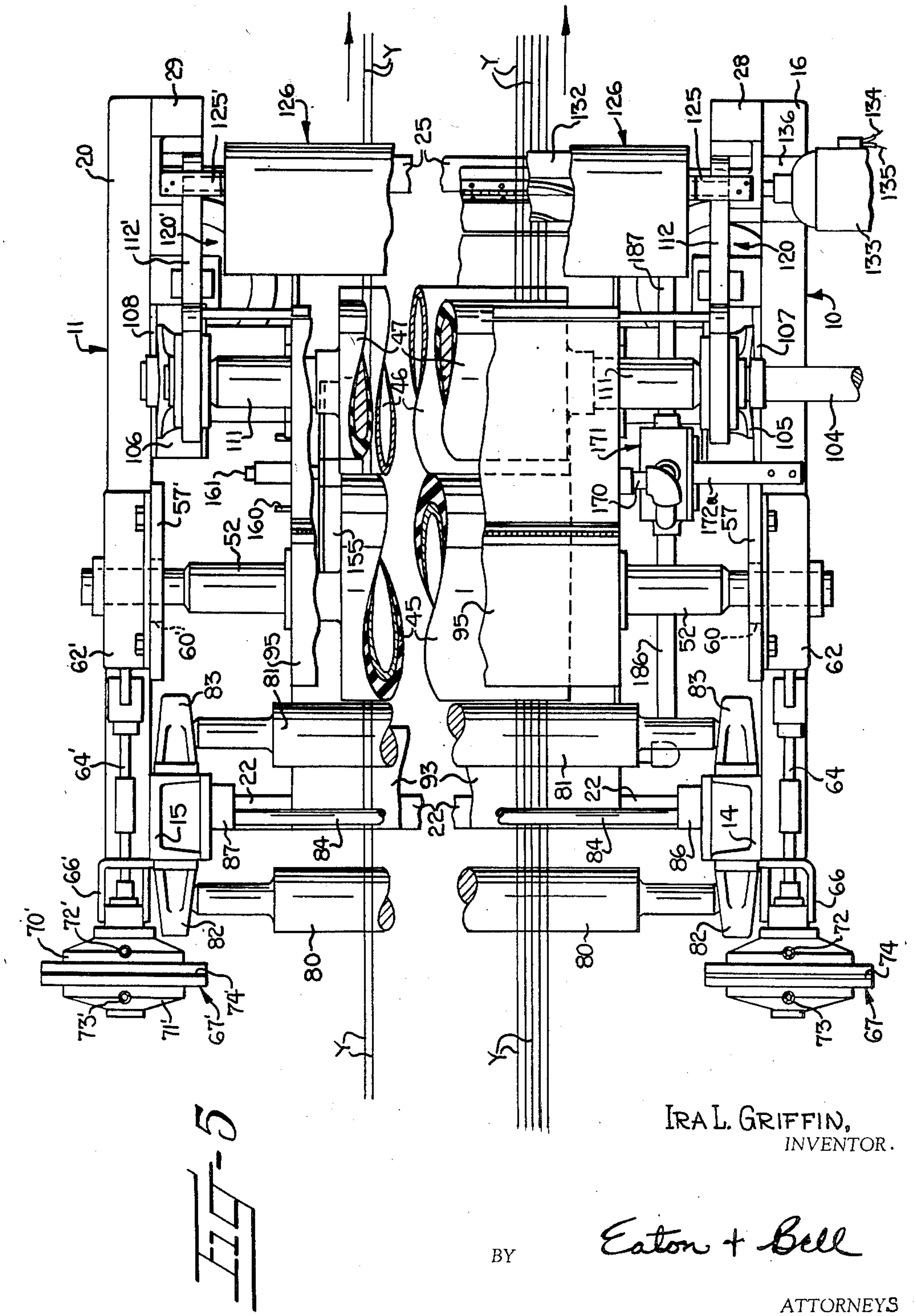
Figure 5 is a top plan view of the improved size box with the central portion thereof broken away.
Figure 6:
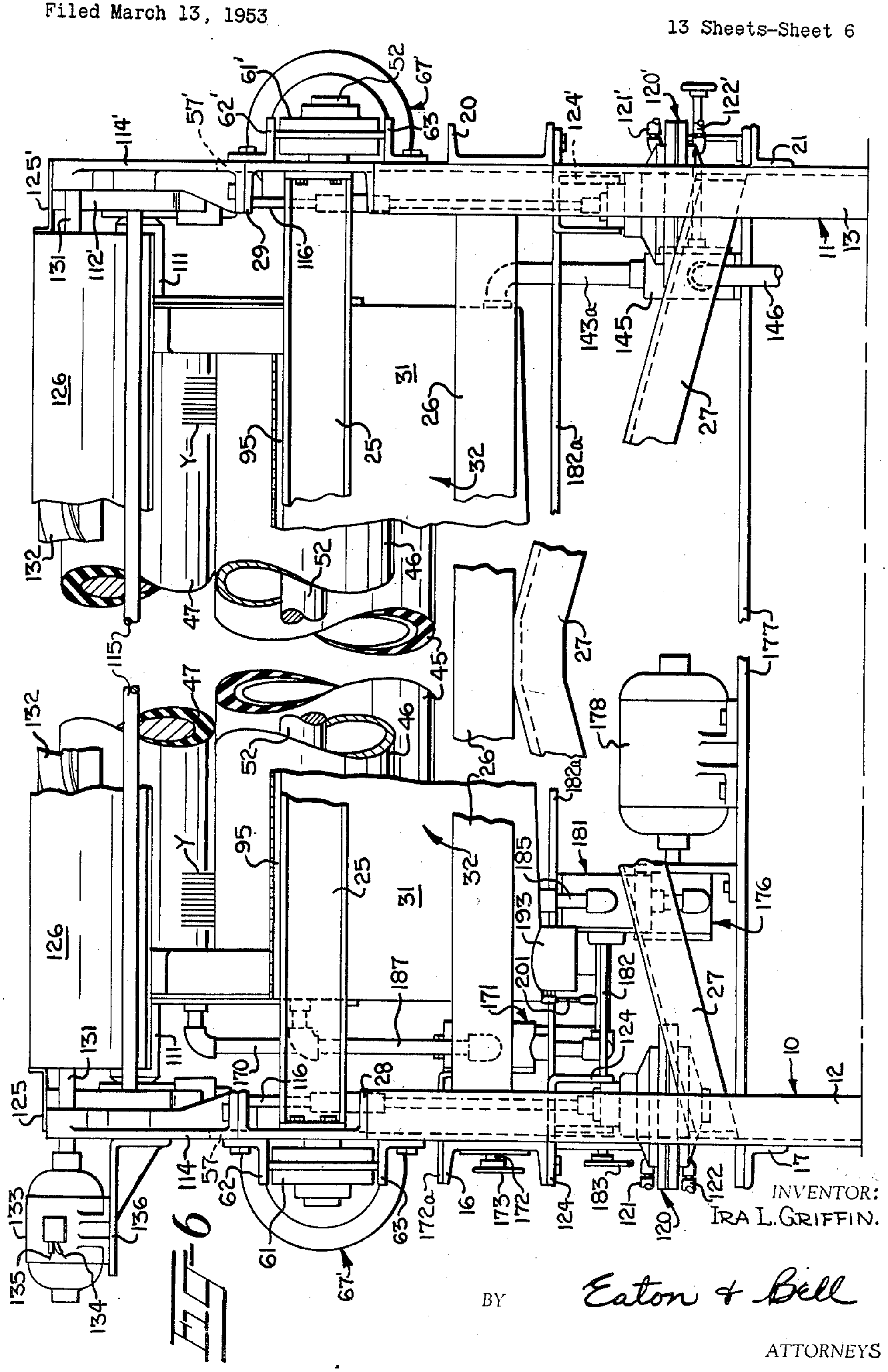
Figure 6 is a front elevation of the size box looking at the right-hand side of Figure 1, with the parts broken away.

It will be observed in Figures 5, 6 and 7 that reduced opposite ends of the immersion roll shaft 52 loosely extend through vertically disposed plates 57, 57', each of which is provided with a longitudinally or horizontally extending slot 60 therethrough to permit forward and rearward movement of the shaft 52 and its immersion roll 45. Since the parts associated with the plates 57, 57' are identical, except being opposite hand, only the parts associated with the plate 57 will be described in detail and like parts associated with the plate 57' will bear the same reference characters with the prime notation added.

The shaft 52 is rotatably mounted in suitable bearings 61, 61' which are preferably of the anti-friction type as shown in Figure 7. The bearing 61 is supported for horizontal sliding movement between upper and lower guide members 62, 63 which are shown, in Figure 7, as being provided with a tongue and groove connection with the bearing 61. The guide members 62, 63 are shown in the form of angle bars suitably secured to the outer surface of the plate 57. The plates 57 and 57' extend downwardly and are suitably secured to the proximal surfaces of the upper longitudinal frame members 16, 20.

The front end of a piston rod or plunger 64 is pivotally connected to the bearing 61, as at 65, and loosely penetrates a bracket 66. The brackets 66 and 66' are suitably secured to the corner posts 14, 15 and support suitable cylinders, air motors or diaphragm assemblies broadly designated at 67 and 67'. The diaphragm assemblies 67, 67' may be of any desired or conventional construction and include respective pairs of end members 70, 70', 71, 71' to which respective pipes or conduits 72, 73, 72', 73' are communicatively connected and between which suitable flexible diaphragms 74, 74' are positioned. It is evident that pistons may be substituted for the diaphragms if desired.

Corresponding ends of the piston rods or plungers 64, 64' are suitably connected to the diaphragms 74, 74'. The pipes or conduits 72, 73, 72', 73' are connected to suitable control means, to be later described, for directing fluid under pressure, such as compressed air, to either side of the diaphragms 74, 74'. When compressed air is directed into the members 71, 71', it is evident that the immersion roll 45 is forced against the lower squeeze roll 46 and, conversely, when compressed air is directed into the members 70, 70', the immersion roll 45 is moved rearwardly, out of engagement with the lower squeeze roll 46, such as may be desired for threading the yarns Y through the size box.

Figure 3:
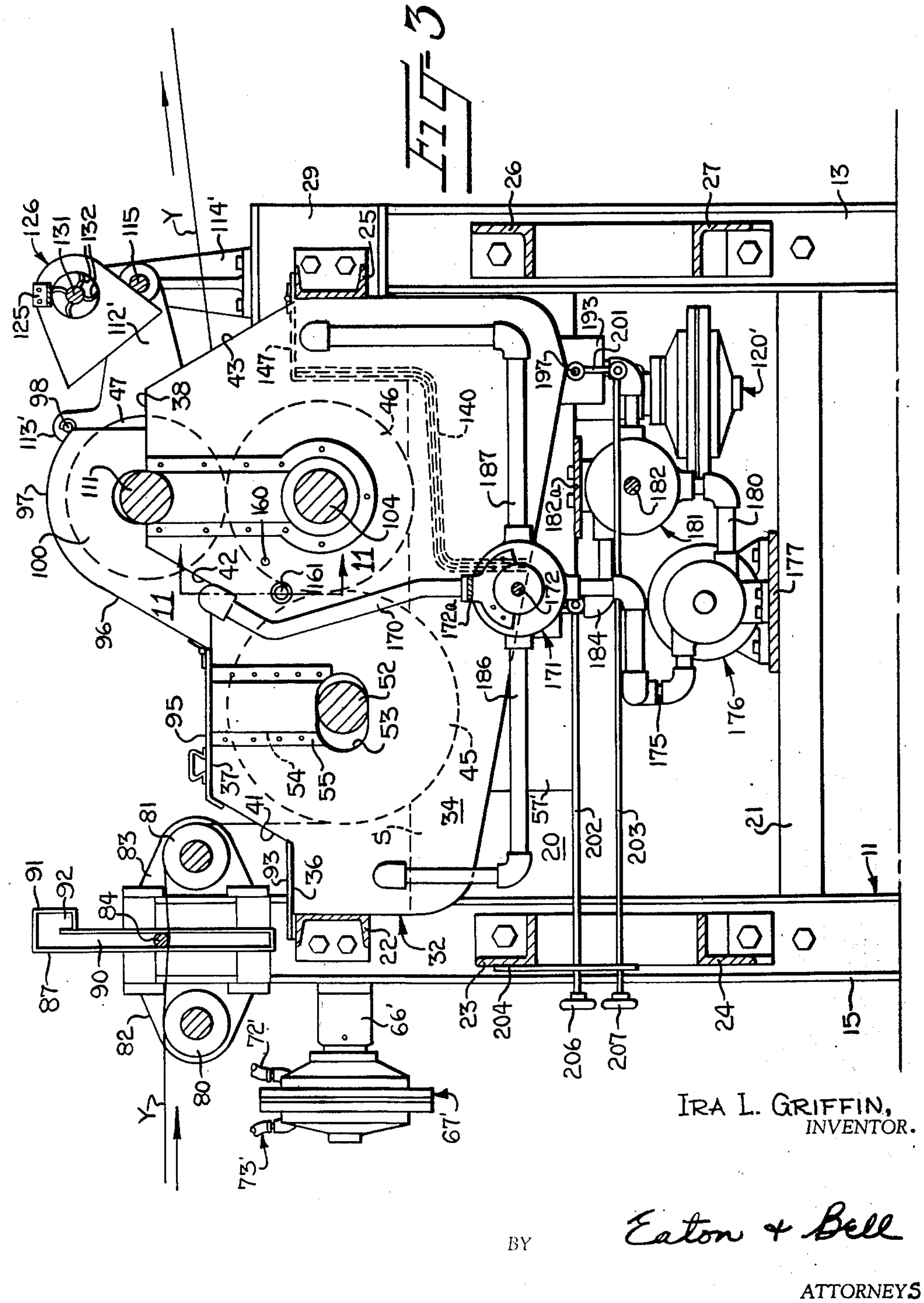
Figure 3 is a longitudinal vertical sectional view through the improved size box showing the tank therefor in elevation and being taken substantially along the line 3—3 in Figure 2.

In the first form of the invention shown in Figures 1 to 14, inclusive, the sheet of yarn Y is directed into the size box from a suitable source, such as a creel, not shown, and passes successively over a pair of spaced horizontally disposed idler rolls 80, 81 whose opposite ends are journaled in bearing blocks 82, 83 suitably secured to the respective rear and front surfaces of the upper portions of the legs or corner posts 14, 15. In order to maintain the sheet of yarn Y under slight tension, and to also prevent excessive vibration thereof as it successively passes over the idler rolls 80, 81, a dancing roll or bar 84 rests upon the sheet of yarn Y at a point between the rolls 80, 81 and is mounted for vertical sliding movement in grooved proximal surfaces of dancing roll guide members 86, 87 suitably secured to the proximal surfaces of the legs or corner posts 14, 15. The groove in each of the members 86, 87 in which the opposite ends of the dancing roll or rod 84 has vertical movement is indicated at 90 (Figure 3).

The upper end of each of the guide members 86, 87 has an offset portion 91 thereon which is provided with a cavity 92 in which the corresponding end of the dancing roll 84 may be positioned during the threading of the sheet of yarn Y through the size box.

Of course, as the yarns Y pass successively over the idler rolls 80, 81, they then pass downwardly into the tank of the size box and engage the rubber covered immersion roll 45 at a point substantially above the level of the sizing solution S. An opening is formed through which the yarns pass from the idler roll 81 to the immersion roll 45 by a cover plate 93 removably secured to the edges 36 of the side walls 34, 35 and spanning the distance therebetween. The upper wall of said opening is defined by a hinged cover 95 which rests upon the stepped edges 37 of the side walls 34, 35 and spans the distance therebetween, this cover 95 being positioned in closely spaced relation above the upper surface of the immersion roll 45.

Figure 4:
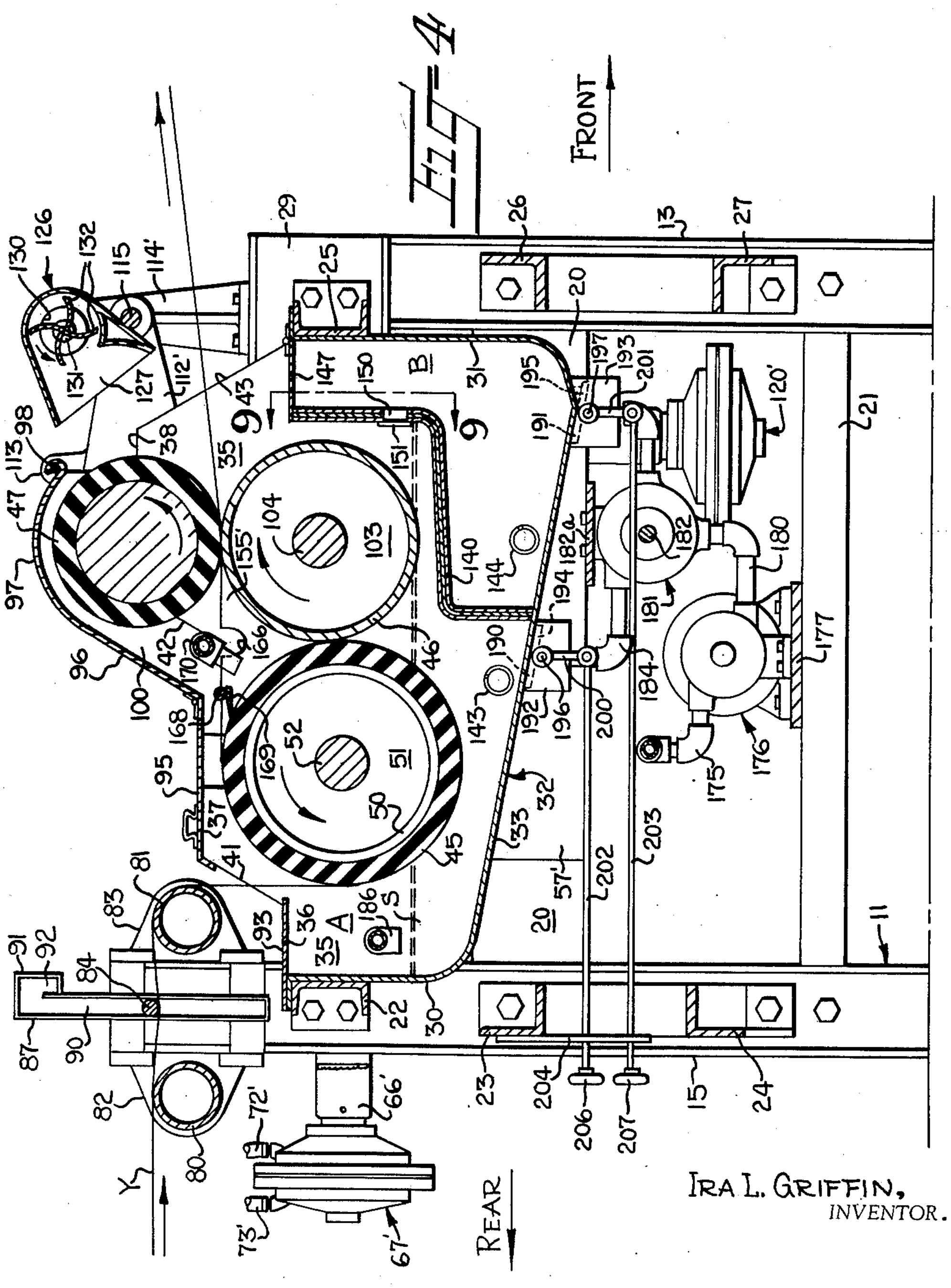
Figure 4 is another longitudinal vertical sectional view through the improved size box taken substantially along the line 4—4 in Figure 2.

The cover 95 also has an upwardly and forwardly inclined portion 96 hingedly connected thereto which is also integral with a curved upper portion 97 which substantially surmounts the upper rubber covered squeeze roll 47 in spaced relation thereto, as is most clearly shown in Figure 4. The cover 95 is preferably hingedly connected to the inclined cover 96 so the cover 95 may be raised and positioned against the cover 96 and whereupon the cover 96, along with the curved portion 97 thereof, may be swung upwardly about a pivot rod 98 at the front edge thereof.

The primary reason for the covers 95 and 96 being hingedly interconnected, is to limit the amount of space required for the covers 95, 96 when in raised position, since it may be desirable to pass a sheet of yarn above the size box to a succeeding size box when such size boxes are arranged in tandem as is quite often the case. It will be noted that the cover 96 and the curved portion 97 thereof are provided with flanges 100 on opposite sides thereof which extend downwardly and whose lower edges conform substantially to the edges 42 and 38 of the side walls 34, 35. Of course, a portion of the flanges 100 also rest upon the front portions of the upper edges 37 of the side walls 34, 35.

It is to be noted that the front edges of the flanges 100 preferably terminate short of the junctures of the edges 38, 43 of the side walls 34, 35 and short of the rear surface of the upper squeeze roll 47 for purposes to be later described. Thus, an egress opening for the sheet of yarns as it passes forwardly from the nip of the upper and lower squeeze rolls 47, 46, is formed between the foremost edge of the curved portion 97 of the front cover 96 and the upper edge of the front wall 31 of the size box tank 32.

As heretofore stated, the lower squeeze roll 46 is preferably of substantially smaller diameter than the rubber covered immersion roll 45 and its axis may therefore be disposed on substantially the same level as the axis of the immersion roll 45. However, it is important that the lower surface of the lower squeeze roll 46 barely touches the level of the sizing solution S disposed within the tank 32, this being the primary reason why the lower squeeze roll 46 is of substantially smaller diameter than the rubber covered immersion roll 45.

The lower squeeze roll 46 is preferably a hollow roll formed from stainless steel or other sheet metal and which is closed at opposite ends thereof by head members 103 whose outer surfaces are spaced substantially from the side walls 34, 35 of the size box tank 32. The head members 103 are fixed on a suitably controlled and driven lower squeeze roll shaft 104, the side walls 34, 35 being apertured to permit the shaft 104 to extend therethrough. Opposite ends of the shaft 104 are rotatably mounted in bearing blocks 105, 106 suitably secured to respective standards 107, 108 (Figures 1 and 5) carried by the respective upper longitudinal frame members 16, 20.

Since the rubber covered upper squeeze roll 47 must bear against the lower squeeze roll 46 with considerable pressure, the upper squeeze roll 47 is preferably of solid construction and has reduced end portions 111 thereon which extend through the side walls 34, 35 and the corresponding lower portions of the flanges 100 of the cover 96 and its curved portion 97. The flanges 100 and the side walls 34, 35 are suitably apertured to permit the shaft portion 111 to extend therethrough. The distal ends of the shaft portion 111 of the upper squeeze roll 47 are suitably journaled in pivoted arms or levers 112, 112', each of which has an upwardly projecting ear 113, 113' thereon for supporting opposite ends of the cover pivot rod or shaft 98 heretofore described.

The arms 112, 112' extend rearwardly and are fixedly mounted on a transversely extending rod 115, the opposite ends of which are pivotally mounted in respective standards 114, 114'. The lower ends of the standards 114, 114' are suitably secured to the upper surfaces of the respective blocks 28, 29. In order to facilitate applying downward pressure to the upper squeeze roll 47, and to also facilitate raising the same out of engagement with the lower squeeze roll 46, when desired, the medial portions of the levers or arms 112, 112' have the upper ends of respective extensible connecting rods or plungers 116, 116' oscillatably secured thereto. The rods 116, 116' extend downwardly between the longitudinal frame members 16, 20 adjacent the respective side walls 34, 35 of the tank 32 and penetrate cylinder heads or diaphragm assembly heads of respective diaphragm assemblies broadly designated at 120, 120' (Figure 6).

Since these diaphragm assemblies 120, 120' may be identical to the diaphragm assemblies 67, 67' a detailed description is deemed unnecessary, it being deemed sufficient to state that the diaphragm assemblies 120, 120' have opposite ends of a pipe or conduit 121 connected to the upper ends thereof and pipes or conduits 122, 122' are connected to the respective lower ends thereof. The pipes 121, 122, 122' are also connected to suitable means, to be later described (Figure 14), for controlling the flow of compressed air into the upper and lower ends of the diaphragm assemblies 120, 120'. The diaphragm assemblies 120, 120' are carried by suitable brackets 124, 124' which extend outwardly and are suitably secured to the lower surfaces of the respective longitudinal frame members 16, 20.

It will be observed in Figures 1, 4 and 6 that the standards 114, 114' project upwardly beyond the respective levers 112, 112' and have the outer ends of respective brackets 125, 125' suitably secured to the upper ends thereof, which extend inwardly and have the opposite ends of a blower housing 126 suitably secured thereto. The blower, of which the housing 126 is a part, may be of any desired or conventional construction and is shown as being a centrifugal type blower in Figure 5 and wherein the housing 126 is provided with an air egress opening 127 extending longitudinally thereof for directing relatively slow moving currents of air into the egress opening of the size box tank 32 formed between the edges of the wall 31 and the curved portion 97 of the cover 96 and also being defined by the side walls 34, 35 of the tank 32.

The blower housing 126 has an air ingress opening 130 at one end thereto through which a shaft 131 extends and on which a suitable fan or blade assembly 132 is fixedly mounted. Opposite ends of the shaft 131 extend beyond opposite ends of the blower housing 126 and are rotatably mounted in the upper portions of the standards 114, 114' (Figure 6). It will also be observed that the shaft 131 is driven by an electric motor 133 having wires or conductors 134, 135 extending therefrom and connected to a suitable source of electrical energy, not shown. The electric motor 133 is suitably secured to a substantially L-shaped bracket or angle clip 136 carried by the corresponding standard 114.

One of the most important features of the present invention is the provision of an insulated partition 140 of substantially Z-shaped configuration which is suitably secured to and spans the distance between the side walls 34, 35 of the size box tank 32. The upper vertical portion of the partition 140 is spaced rearwardly of the front wall 31 and is also spaced forwardly of, but in close proximity to, the lower squeeze roll 46. The horizontal portion of the partition 140 is also spaced closely beneath the lower squeeze roll 46, but a sufficient space is left to permit an ample amount of sizing solution S to be disposed between the partition 140 and the lower squeeze roll 46.

The lower edge of the partition 140 is fixed to, and in sealing engagement with, the bottom wall 33 of the size box tank 32. The uppermost edge of the substantially Z-shaped partition 140 is preferably disposed at substantially the same elevation as the upper edge of the front wall 31 of the size box tank 32 and, thus the partition 140 defines a pair of chambers indicated at A and B in the size box tank 32.

The chamber or compartment A may be termed as an operating or active chamber, since the squeeze rolls 46 and 47 and the immersion roll 45 are disposed therein. The chamber or compartment B may be termed as an inactive or storage chamber, since a supply of sizing solution may be maintained at proper operating temperature within the chamber B for replacing the sizing solution S within the chamber or compartment A as will be more fully described later in this context.

The chambers A and B have respective open steam coils 143, 144 therein (Figures 4 and 13) through which a thermostatically controlled source of steam is directed from a suitable source, not shown, for maintaining the sizing solution S, in each of the compartments or chambers A, B, at a uniform temperature.

Figure 13:
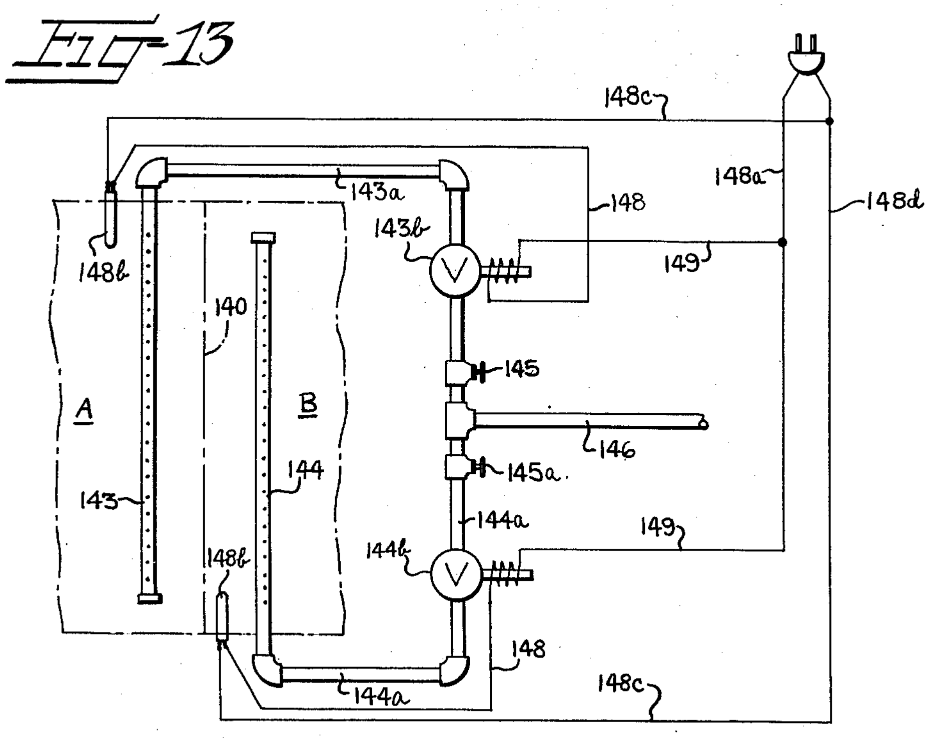
Figure 13 is a schematic diagram showing the means for controlling the flow of steam to the two compartments of the tank of the size box.

It will be observed in Figure 13 that the steam coils or pipes 143, 144 have respective pipes 143*a*, 144*a* extending therefrom and being connected to opposite sides of respective manually controlled valves 145, 145*a* which may be of any desired or conventional construction and a detailed description of which is deemed unnecessary. The valves 145, 145*a* also have a steam pipe 146 connected thereto which extends from a suitable source of steam, not shown. Interposed in the respective pipes 143*a*, 144*a* are solenoid valves 143*b*, 144*b* and a pair of wires 148, 149 are connected to opposite ends of the coils of each of the solenoid valves 143*b*, 144*b*. The wires 149 are connected to a common lead wire 148*a* extending from a suitable source of electrical energy.

Each of the wires 148 is connected to a suitable heat responsive, bi-metallic or thermostatic switch 148*b*, one of which is suitably mounted in each of the compartments A and B of the tank 32. These switches 148*b* are preferably of a type which are normally closed at room temperatures and, upon being heated to a predetermined temperature, they will open. When closed, switches 148*b* complete circuits to, and thereby close, the corresponding solenoid valves **143*b*, 144*b*. The sides of the switches 148*b* remote from the corresponding wire 148 are connected to corresponding ends of wires 148*c* whose other ends are connected to a common lead wire 148*d* connected to the opposite side of the source of electrical energy from that to which the wire or conductor 148*a*** is connected.

It is thus seen that the valves **145, 145*a* may be manually adjusted to prevent steam from entering either of the steam coils 143, 144 or may be adjusted to permit the steam to enter either one of the coils 143, 144 independently of each other, or they may be adjusted to permit the steam to enter both of the coils 143, 144 simultaneously. Also, upon the sizing solution in the corresponding compartments A, B being heated sufficiently, the corresponding switches 148*b* will open to permit the solenoid valves 143*b* and 144*b* to close and to thereby prevent steam from entering the coils 143, 144**, and to thereby maintain the sizing solution in each of the chambers or compartments A, B at a uniform operating temperature.

In order to prevent excessive evaporation of any sizing solution S which may be disposed within the storage compartment or chamber B of the size box tank 32 and to also assist in maintaining the sizing solution therein at a proper operating temperature, the upper end of the compartment B is closed by a hinged cover 147 (Figure 4) hingedly connected to the upper edge of the front wall 31 of the size box tank 32 and which rests upon the upper edge of the upper vertical portion of the partition 140.

In order to maintain the sizing solution S at a maximum level, wherein the sizing solution barely touches the lower surface of the lower squeeze roll 46, the upper vertical portion of the partition 140 is provided with an overflow opening 150 therein (Figures 4 and 9) through which the excess solution in the compartment A flows into the compartment B. There are times when it is necessary to close the opening 150, as will be later described, and, to this end, a suitable closure member 151 is pivotally connected to the surface of the partition 140 adjacent the compartment A and may be swung about its pivot point to open or closed position, when desired.

It is particularly important to note that the nip of the immersion roll 45 and the lower squeeze roll 46 is spaced substantially above the level of the sizing solution S in the operating compartment A (Figure 4) which level is maintained by the overflow opening 150 in the upper vertical portion of the partition 140. Thus, as the yarns Y pass into the size box tank 32, they engage the immersion roll 45 at a point well above the level of the sizing solution S and also leave the roll 45 at a point well above the level of the sizing solution S. Since the yarn engages substantially half of the periphery of the immersion roll 45 in its course through the size box, and at all times while the yarn is immersed in the sizing solution in the lower portion of the compartment A, this obviates stretching the yarn Y while it is saturated so the sheet of yarns is pulled from the creel beams or other source under a minimum amount of tension in the wet state. Also, since the nip of the rolls 45, 46 is spaced substantially above the level of the sizing solution S, the air in the yarns is exhausted therefrom as the excess sizing solution is squeezed therefrom at the nip of the rolls 45, 46.

Also, due to the relatively large diameter of the rubber covered immersion roll 45, a relatively large valley is formed above the nip of, and between, the immersion roll 45 and the lower squeeze roll 46, to which sizing solution may be directed by means to be later described. Opposite ends of said valley may be closed in order to maintain sizing solution at a predetermined level in said valley by means which will now be described in detail.

Figures 10, 12:
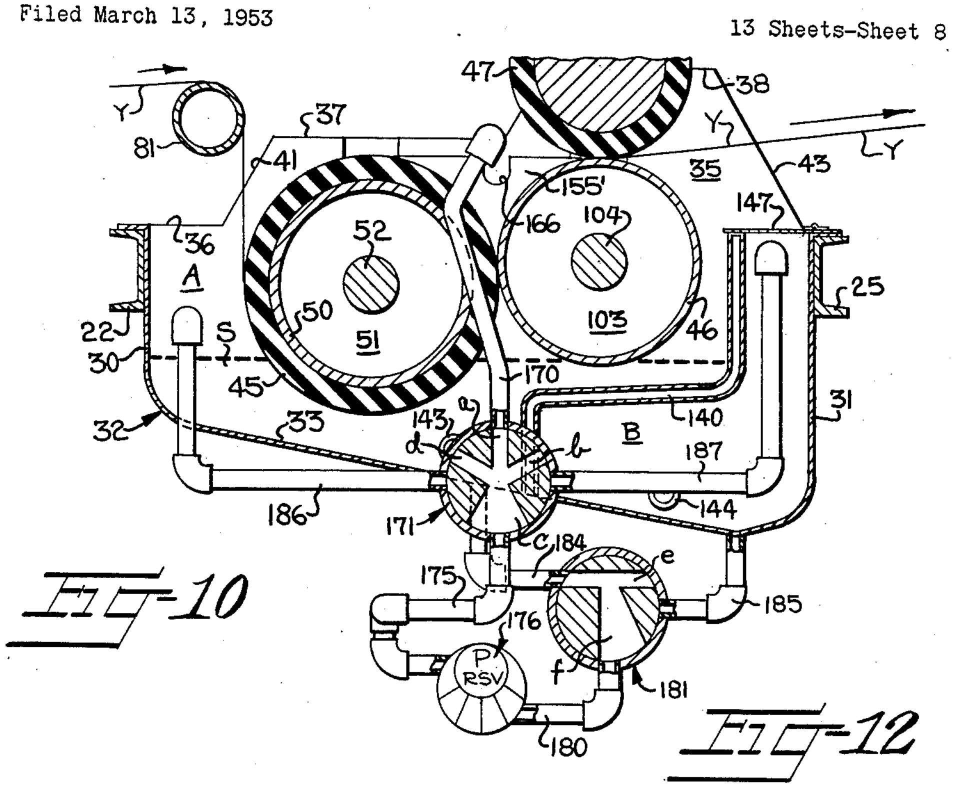
Figure 10 is a vertical sectional view similar to the central portion of Figure 4, but showing schematically, means for controlling the flow of sizing material between the compartments and valley of the size box tank.
Figure 12 is a view similar to Figure 11, but showing the closure means in a different position from that shown in Figure 11 or in inoperative position.
Figure 11:
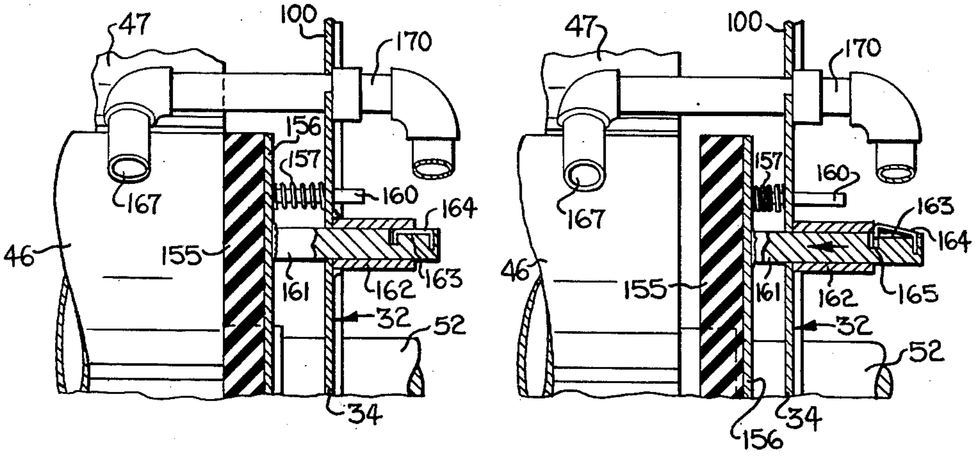
Figure 11 is a fragmentary vertical sectional view taken substantially along the line 11—11 in Figure 3, showing the closure means, at one end of the valley formed between the upper portions of the immersion roll and the lower squeeze roll, in operative position.

Referring particularly to Figures 11 and 12, it will be observed that corresponding opposite ends of the immersion roll 45 and the squeeze roll 46, which are spaced substantially from the side walls 34, 35 of the size box tank 32, are each engaged by respective resilient closure members 155, which closure members are preferably made from a semi-hard rubber of sufficient size to engage the corresponding ends of the immersion roll 45 and the lower squeeze roll 46 and to span the distance between the uppermost surfaces thereof, which are preferably disposed on substantially the same level. The resilient closure members 155 are suitably secured to respective backing plates 156 made from a rigid material. In order to normally urge the closure members 155 to the closed position substantially as shown in Figure 11, the outer surfaces of the backing plates 156 are engaged by two or more respective compression springs 157 which surround respective guide rods 160. The guide rods 160 are fixed at their inner ends to the corresponding backing plates 156 and extend outwardly and slidably penetrate the respective side walls 34, 35. Also, in order to guide the closure members 155, and to maintain the same in either operative or inoperative position, each of the backing plates 156 has one end of a shaft 161 fixed thereto as is most clearly shown in Figures 11 and 12. The side walls 34, 35 each has a guide block or bushing 162 suitably penetrated by the outer portion of the corresponding shaft 161.

Each of the shafts 161 has a keyway or groove 163 in the outer portion thereof in which the horizontal portion of a substantially U-shaped spring clip 164 is normally positioned as shown in Figure 11. The outer leg or arm of the spring clip 164 is fixedly embedded in the shaft and the inner leg thereof is adapted to have free vertical movement in a cavity 165 in the shaft 161. This spring clip 164 is normally inherently biased upwardly, as shown in Figure 12 and, when the operator moves the closure members 155 outwardly, in spaced relation to the corresponding ends of the immersion roll 45 and the lower squeeze roll 46, to substantially the position shown in Figure 12, the inner portion of the spring clip 154 moves upwardly and, upon the closure members 155 being released, the spring clip 164 engages the outer end of the corresponding bushing or guide block 162 thereby maintaining the corresponding closure member 155 in spaced relation to the corresponding ends of the rolls 45, 46. The closure members 155 occupy the position shown in Figure 12 only when it is not desired that the valleys formed therebetween be used. Of course, when said valley is in use, the resilient closure members 155 occupy positions in sliding engagement with the opposite ends of the rolls 45, 46 as shown in Figure 11.

It will be observed in Figure 4 that one of the closure members and its backing plate has an overflow opening or groove 166 in the upper edge thereof through which the excess solution fed into the valley defined by the upper portions of the rolls 45, 46 may pass. The excess solution which passes through the opening 166 will fall into the lower portion of the compartment A of the size box tank 32. By referring to Figure 4 there will be observed a rod 168 which extends between the closure plates 155 and rests in notches provided therein. The rod 168 is provided with a blade 169 which rests, by gravity, on the immersion roll 45 and may be provided to check any excess sizing solution that may be carried upwardly by the roll 45 from the valley formed between the rolls 45 and 46.

The discharge end 167 of a valley feed pipe 170 is disposed immediately inwardly of the resilient valley closure member 155 (Figures 11 and 12). The pipe 170 extends upwardly and then passes outwardly through suitable openings provided therefor at the juncture of the corresponding flange 100 and the upper edge 37 of the side wall 34 and then extends downwardly and is connected to a suitable manually operable, manifold valve mechanism 171 which may be disposed remote from the size box, if desired (Figures 5 and 10). However, it will be observed in Figures 1, 3 and 5 that the valve mechanism 171 depends from a plate **172*a* fixed to the upper surface of the longitudinal frame member 16**.

The valve assembly 171 is shown schematically in Figure 10 and the core thereof is provided with interconnected passageways *a, b, c* and *d*. Disposed substantially diametrically opposite the pipe or conduit 170, and connected to the valve assembly 171, is one end of a pipe or conduit 175 whose other end is connected to a suitable fluid pressure pump 176 which may be of any desired or conventional construction and which is shown as being driven by an electric motor 178 (Figure 2) having wires 179 extending therefrom to a suitable source of electrical energy, not shown. The pump 176 is shown schematically in Figure 10 as being of the rotary sliding vane type, but it is to be understood that any type of pump may be used. It will be observed in Figures 1, 2, 3 and 4 that the housing of pump 176 and motor 178 are suitably secured to a transverse plate 177 suitably secured to, and spanning the distance between, the lower longitudinal frame members 17, 21. The core of the valve 171 is operated by a control rod 172 (Figures 1, 3, 4 and 7) which extends through the frame member 16 and has a handle or position indicator 173 fixed on its outer end. It is thus seen that manipulation of the handle 173 will cause the rod 172 to impart rotation to the core of the valve 171.

Now, referring again to Figure 10, it will be observed that the pump 176 has one end of an ingress pipe 180 connected thereto whose other end is connected to a suitable two-way valve broadly designated at 181. Here again, the two-way valve 181 may be of any desired or conventional construction and is only shown schematically in Figure 10. This valve 181 is also shown in Figures 1, 2, 3, 4 and 6, wherein the housing thereof is suitably secured to the lower surface of a transverse plate 182*a* whose opposite ends are suitably secured to the lower surfaces of the transverse frame members 16, 20.

The core of the two-way valve 181 has a passageway *e* extending from one side to the other thereof which communicating with a relatively large passageway *f* (Figure 10). The passageway *f* is so arranged that it communicates with the pipe 180 at all times except when valve 181 is in the "off" position and, on the other hand, one end of the passageway *e*, at times, communicates with a pipe or conduit 184 and, at other times, communicates with a pipe or conduit 185. The ends of the conduits or pipes 184, 185 are connected to the lower wall 33 of the size box tank 32 for communication with the respective chambers A and B. The core of the valve 181 may be rotated so as to be in alignment with the desired pipes by a control rod 182, the opposite end of which is rotatably mounted in a bracket 183*a* fixedly secured to the frame member 16, and a control handle or indicator 183 is fixedly secured to the rod 182.

It will be observed in Figures 3 and 10 that the housing of the manually operable valve 171 also has corresponding ends of substantially diametrically opposed pipes or conduits 186, 187 connected thereto, which may be termed as an operating chamber filler pipe and a storage chamber filler pipe, respectively. The ends of the pipes or conduits 186, 187 remote from the manifold valve 171 penetrate the side walls 34 of the size box tank 32 at points above that at which the level of the sizing solution will be at any time within the particular chambers A or B.

Now, the various pipes and valves heretofore described are provided for collectively controlling the flow of sizing solution between the chambers A, B and the valley defined by the upper portion of the immersion roll 45 and the lower squeeze roll 46, and it is to be understood that the circulatory system usually provided in size boxes may be used for initially placing a supply of sizing solution in compartment A and for circulating the same. This usual circulatory system is not necessarily a part of the present invention and is not shown.

There are times when it becomes necessary to empty the liquid contents of either or both of the chambers A, B without transferring the liquid contents thereof from one of the chambers to the other or vice versa. Accordingly, it will be most clearly observed in Figure 4 that the respective portions of the bottom wall 33 of the size box tank 32 defining the bottoms of the chambers A, B are provided with egress or fluid discharge openings 190, 191 which are disposed at the portions of the bottom wall 33 of the size box tank 32 defining the lowermost bottoms to the respective chambers A, B. The bottom wall 33 has the upper ends of a pair of pipes or conduits 192, 193 connected thereto for communication with the respective fluid discharge openings 190, 191. Although these pipes 192, 193 are shown as being relatively short in Figure 4, it is to be understood that they may extend downwardly and be connected to the usual sewer line, if desired. However, the pipes 192, 193 may be used in the form shown in the drawings in the event it is satisfactory to permit the fluid from within the chambers A, B to be discharged onto the floor on which the size box rests.

Mounted in the relatively short pipes 192, 193 are respective valve members 194, 195 for controlling the discharge of fluid from the respective chambers A, B. These valves 194, 195 may be controlled and mounted in any desired manner and, in this instance, the medial portions of the valves 194, 195 are fixed to transverse pivot rods 196, 197 oscillatably mounted in opposite sides of the respective pipes 192, 193. Corresponding ends of the pivot rods 196, 197 have the upper ends of respective links 200, 201 fixed thereto, to the lower ends of which the front ends of connecting rods 202, 203 are pivotally connected. The connecting rods 202, 203 extend rearwardly and are mounted for horizontal sliding movement in a guide plate 204 depending from, and being suitably secured to, the transverse frame member 23 heretofore described. The outer or rear ends of the connecting rods 202, 203 have respective knobs 206, 207 fixed thereon to facilitate manipulation thereof for opening and closing the valves 194, 195.

Figure 14:
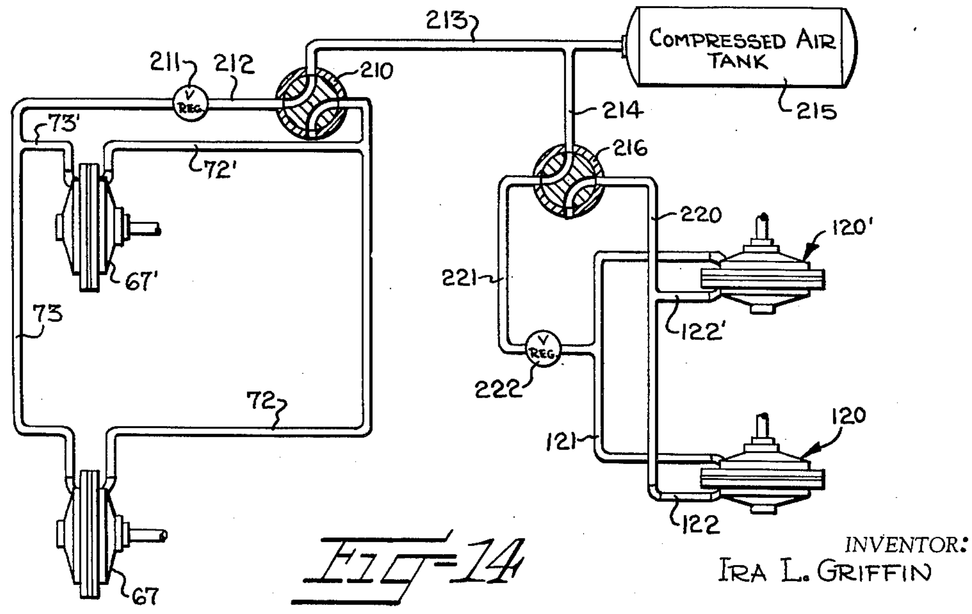
Figure 14 is a schematic diagram showing the means for controlling the flow of air pressure directed to the air motors controlling the immersion roll and the upper squeeze roll.

The diaphragm assemblies 67, 67', which control the position of the immersion roll 45 relative to the lower squeeze roll 46, have the respective pipes 72, 73 and 72' 73' connected thereto. Referring to Figure 14 it will be observed that the ends of pipes 72, 73 remote from diaphragm assembly 67 are connected to a four-way valve 210 and a regulator valve 211 respectively. The other side of the regulator valve 211 has a pipe 212 extending therefrom to the four-way valve 210. The ends of pipes 72', 73' remote from diaphragm assembly 67' are connected intermediate the ends of the respective pipes 72, 73. A pipe 213 is connected to the four-way valve 210 at one end thereof and its other end is connected to a suitable source of fluid under pressure, such as compressed air, as indicated by a compressed air tank 215. One end of a pipe 214 is connected intermediate the ends of the pipe 213, and its other end is connected to a four-way valve 216.

The four-way valves 210, 216 may be of any desired or conventional construction and are merely shown schematically in Figure 14. The valve 210 is of a type which will, at times, permit compressed air to flow from the pipe 213 into pipe 72 and, at other times, will permit compressed air to flow from the pipe 213 into the pipe 212 as it is exhausted from the pipe 72. The valve 216 also has pipes 220, 221 connected thereto. The end of pipe 220 remote from valve 216 is connected to one end of pipe 122 which, as heretofore stated, is connected to the lower end of the diaphragm assembly 120. Pipe 122' leads from diaphragm assembly 120' to the pipe 220. The end of pipe 221 remote from valve 216 is connected intermediate the ends of pipe 121 and has a suitable pressure regulator valve 222 interposed therein.

*Method of operation*

During a change of yarn sets, the rolls 45, 46, 47 are stopped and the four-way valve 210 is adjusted to permit compressed air to pass from the pipe 213 into pipes 72, 72' and to be exhausted through the pipes 73, 73', regulator valve 211 and pipe 212 which, of course, moves the immersion roll 45 rearwardly out of engagement with the lower squeeze roll 46. Now, assuming there is a supply of sizing solution in the compartment A of the size box tank 32, the valve 194 may be opened by moving the connecting rod 202 from right to left in Figure 4 or, the valve 194 may be left closed and the core of valve 171 adjusted so the passageway *b* (Figure 10) registers with the pipe 187 and the core of valve 181 adjusted to occupy the position shown in Figure 10. In the latter instance, assuming the pump 176 to be operating, the sizing solution will then be transferred from the compartment A into the compartment B as it is caused to flow successively through pipe 184, valve 181, pipe 180, pump 176, pipe 175, passageways *c* and *b* in valve 171 and thus through pipe 187 into the compartment B.

Figure 9:
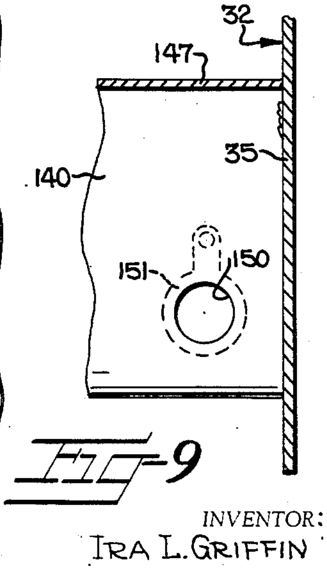
Figure 9 is an enlarged fragmentary elevation, with parts in section showing the overflow opening in the partition between the active compartment and the storage compartment of the size box tank and being taken substantially along the line 9—9 in Figure 4.

Assuming a prior set of yarns to have been removed from the size box, the covers 95, 96 are swung in a clockwise direction to open position and the valve member or closure member 151 is moved to closed position as shown in Figure 9. Thus, the compartment A of the size box tank 32 may be thoroughly cleansed by washing the same with hot or cold water or with any desired detergents, during which time the valve 145 would be closed and the valve 145*a* would be open to prevent steam from entering the steam coil 143 while permitting the steam to enter the steam coil 144 in the event that the sizing solution then in the storage compartment B is below the desired temperature. It might be stated that there is very little heat lost in the transfer of the sizing solution S between the compartments A or B, due to the relatively short lengths of the various pipes through which the sizing solution passes., Also, if so desired, the pipes may be suitably insulated to further prevent heat loss.

Also, at the time that the immersion roll 45 is moved rearwardly out of engagement with the lower squeeze roll 46, the valve 216 is adjusted to permit compressed air to enter the pipe 220 and to be exhausted through the pipe 221 and to thereby admit compressed air to the lower ends of the diaphragm assemblies 120, 120', whereupon the piston rods 116, 116' will move upwardly to, in turn, cause the respective arms or levers 112, 112' to swing upwardly and raise the upper squeeze roll 47 out of engagement with the lower squeeze roll 46. This will also raise the front end of the curved portion 97 of the cover 96.

The new set of yarns is then threaded over the idler rolls 80, 81, beneath the immersion roll 45, and between the squeeze rolls 46, 47 and thence outwardly through the egress opening formed between the size box tank cover and the front wall 31 of the tank 32. Assuming the core of the valve 181 (Figure 10) to then be in closed position, that is, so that the passageway *e* does not register with either of the pipes 184 or 185 during the cleaning of the compartment A, the valve 194, which is preferably open during the cleaning of the compartment A, is closed. The valve 145 is then opened to permit steam to enter the steam coil 143 and whereupon the core of valve 171 is so positioned that the passageway *d* registers with the pipe 186. The core of the valve 181 is then adjusted so the passageway *e* registers with pipe 185 and whereupon the sizing solution then in the storage compartment B is transferred therefrom into the operating compartment A. It might be stated that, during the cleaning of the operating compartment A, the valley closure members 155, 155' are moved to the inoperative position or to the position shown in Figure 12, in the manner heretofore described.

The core of valve 171 may then be adjusted so that the passageways *a, b, d* will not register with any of the adjacent pipes and, when the sizing solution S in the operating compartment A has heated sufficiently, the valves 210, 216 are then adjusted to admit compressed air to the front ends of the diaphragm assemblies 67, 67' and to the upper ends of the diaphragm assemblies 120, 120' while permitting compressed air to be exhausted from the other ends of said diaphragm assemblies and to thereby move the immersion roll 45 and the upper squeeze roll 47 into engagement with the lower squeeze roll 46 under the predetermined desired pressure (Figure 4).

The lower squeeze roll 46 is then driven by conventional means, not shown, to impart rotation to all of the rolls 45, 46, 47 for moving the sheet of yarns Y through the size box. Of course, upon the new set of yarns Y being threaded through the size box, the covers 95 and 96 are again closed and the electric motor 133 is energized to rotate the blade 132. The blower 126 then directs relatively slow moving currents of air into the discharge end of the size box tank 32, which relatively slow moving currents of air pass outwardly through the ingress opening of the size box tank 32 to thereby preheat the yarn Y before it engages the sizing solution S in the operating compartment A.

Now, if so desired, a supply of sizing solution may be placed in the storage compartment B, which sizing solution may be either the same or different from that in the operating compartment A, and the spring clips 164 may be pressed downwardly by the operator to permit the closure members 155, 155' to move into the operative position in which the closure member 155 is shown in Figure 11. The core of the valve 171 may then be adjusted to the position shown in Figure 10 as the core of the valve 181 is adjusted to either the position shown in Figure 10 or so that the passageway *e* registers with the pipe 185. Thus, in the first instance, the sizing solution may be circulated from the lower portion of the compartment A into the valley formed between the upper portions of the immersion roll 45 and the lower squeeze roll 46, which solution, upon reaching the desired level, will overflow through the opening 166 (Figure 4) in the valley closure member 155' and fall back into the lower portion of the compartment A. As heretofore stated, the valve or closure member 151 would then be in open position to prevent the accumulation of an excess amount of sizing solution in the compartment A.

When the core of the valve 171 is in the position shown in Figure 10 and the passageway *e* of the valve core of valve 181 is in register with pipe 185, it is evident that the sizing solution is then transferred from the storage compartment B into the valley between the valley closure plates 155, 155'. In most instances the sizing solution would be transferred from the storage compartment B into said valley as the sizing solution S in the tank A will probably have been emptied therefrom unless it is inconsequential that the sizing solution in the storage compartment B is mixed with the sizing solution in the lower portion of the operating compartment A.

It is evident that the storage compartment B may be cleaned as readily and in substantially the same manner as the operating compartment A by proper adjustment of the cores of the valves 171 and 181.

It is thus seen that I have provided an improved yarn sizing apparatus wherein a relatively large immersion roll is employed and whereby a substantial portion of the immersion roll may be immersed in the sizing solution in the operating compartment A while a relatively small portion of the lower squeeze roll is immersed in the sizing solution S. It is also seen that the position of the nip of the rolls 45, 46 provides an air escapement space between the level of the sizing solution and said nip as well as forming a valley thereabove to thereby cause the air to be squeezed out of the yarn along with the excess sizing solution as the yarn moves upwardly from the sizing solution to the nip of the rolls 45, 46.

It is also seen that I have provided a partition in the tank of the size box forming the same into respective operating and storage compartments and wherein means are provided for transferring the sizing solution from either compartment to the other and wherein means are provided to also facilitate transferring the sizing solution from either of said compartments to the valley formed above the nip of the rolls 45, 46. It is evident that the lower squeeze roll 46 may be covered with a resilient material instead of the immersion roll, if desired.

*Second form of means for imparting movement to the immersion roll relative to the lower squeeze roll*

In Figures 15 to 20, inclusive, there is shown a second form of means for controlling the position of the immersion roll relative to the lower squeeze roll and, since the major portions of the size box shown in these views are substantially the same as those shown in Figures 1 to 14, inclusive, like parts of the structure shown in Figures 15 to 20, inclusive, will bear the same reference characters with the capital "A" prefixing each of the numerals, in order to avoid repetitive description. In the first form of the invention, means are provided for only moving the immersion roll 45 forwardly and rearwardly relative to the lower squeeze roll 46. The primary purpose of the structure shown in Figures 15 to 20, inclusive, is to provide means for raising and lowering the immersion roll A45 which operates in conjunction with means for imparting forward and rearward movement thereto relative to the lower squeeze roll A46.

The structure shown in Figures 15 to 20, inclusive, also differs from that shown in Figures 1 to 14, inclusive, in that the size box tank A32 is devoid of a cover means and a partition, such as partition 140 in Figure 4, although it is to be understood that such elements may be included with the structure shown in Figures 15 to 20, inclusive. Also, only one clean out or discharge pipe A193 and corresponding valve means need be provided for the tank A32 and, since the tank A32 forms a single chamber, the piping arrangement for transferring of the sizing solution in Figure 15 differs materially from that shown in Figure 10.

In this instance, the end of pipe A175 remote from pump A176 (Figure 15) is communicatively connected directly to the lower portion of the tank A32 and the open upper end of pipe A170 communicates with the valley formed between the upper portions of the rolls A45, A46. Also, the longitudinal frame members A16, A20 extend rearwardly beyond the respective corner posts A14, A15 to acommodate the improved means for supporting the immersion roll shaft A52 and the front idler roll A81.

It will be noted that each of the side walls A34, A35 of tank A32 has a curved slot 250 therein extending forwardly and downwardly from the rear portion of the corresponding upper edge A37 and terminating above the normal level of the sizing solution A—S and through which the corresponding portions of the immersion roll shaft A52 extends. It will be noted in Figures 15 and 17 that the bearing block A61 and the guides A62, A63 therefor are carried by an arm 251. The structure at both ends of the immersion roll shaft A52 being identical except opposite hand, only the structure at the side shown in Figures 15 and 17 will thus be described in detail.

The rear end of the arm 251 is fixedly secured to a shaft 252 pivotally supported on a standard 253 carried by the corresponding longitudinal frame member A16. Since the arm 251 must be relatively long, it will be noted that the structure in Figures 15, 17 also differs from that shown in Figure 4, for example, in that the legs A14, A15 are spaced substantially from the rear wall of the size box tank A32, and, thus the transverse frame member A22 is fixed at opposite ends thereof to suitable plates or brackets 254, 254' (Figure 19) which extend rearwardly and are fixed to the corresponding legs A14, A15. Also, instead of the front idler roll A81 being mounted in bearings carried by the legs A14, A15, it will be observed in Figures 15, 17 and 19 that the upper portion of the arm 251 has a projection 255 thereon in which the end of the front idler roll A81 is journaled.

In order to limit downward movement of the arm 251 and to thereby limit downward movement of the immersion roll A45, it will be noted that, when the arm 251 is in operating position (Figure 15), the front portion thereof rests upon the upper end of an abutment shown in the form of an adjustment screw 256 which slidably penetrates the flange of the corresponding channel-shaped frame member A16 and is held in adjusted position by lock nuts 257. The arm 251 is also held in lowered position by a suitable manually operable latch means 260 mounted for sliding movement in a block 261 carried by the corresponding longitudinal frame member A16 and which latch member normally engages a hook member 262 depending from the front portion of the bracket or arm 251.

Now, in order to impart movement to the immersion roll A45 in both horizontal and vertical directions, the bearing A61 has a link 265 pivotally connected thereto whose other end is pivotally connected to one arm of a bell crank 266 pivotally supported at the juncture of said arm, as at 267, on the bracket or arm 251 at a point substantially above the level of the bearing A61. The other arm of the bell crank 266, which extends rearwardly from the pivot point 267, has the upper end of an extensibly adjustable connecting rod or piston rod 270 pivotally connected thereto which extends downwardly and forwardly at a slight angle, relative to the vertical, and penetrates the head of a cylinder 271. The cylinder has a suitable piston therein to which the lower end of the connecting rod is fixed. The lower end of the cylinder 271 is pivotally supported on a bearing block 273 carried by the corresponding longitudinal frame member A17. A like arrangement is provided on the opposite side of the frame.

Figures 15, 16:
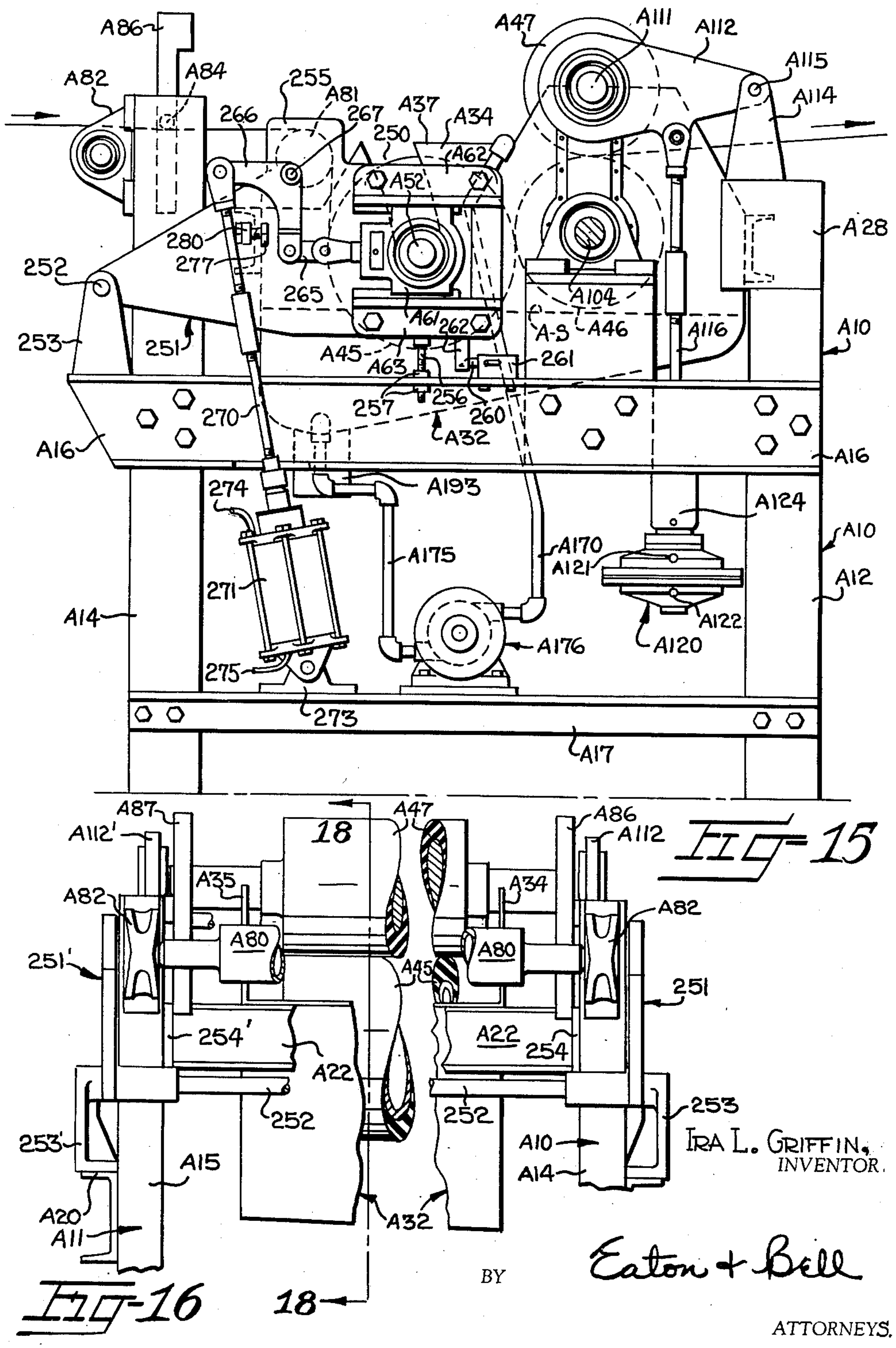
Figure 15 is a view similar to Figure 1, but showing a modified means for controlling the position of the immersion roll relative to the lower squeeze roll.
Figure 16 is a fragmentary rear elevation of the form of the invention shown in Figure 15, looking at the left-hand side of Figure 15 with the central portion thereof broken away.

Each of the cylinders 271 has pipes or conduits 274, 275 connected to the respective upper and lower ends thereof which may be connected, in the same manner as the respective pipes 73, 73' and 72, 72' in Figure 14, to suitable valve means and a source of compressed air and a detailed description thereof thus being deemed unnecessary. Accordingly, upon admitting compressed air the lower ends of the cylinders 271, while exhausting compressed air from the upper ends thereof. the bell cranks 266, of which only one is shown in Figure 15, are caused to move rearwardly at the lower ends thereof until they engage corresponding abutments 277. It will be noted in Figures 15 and 17 that the abutment screw 277 is threadably embedded in a lateral projection 280 integral with the arm 251.

As the lower portion of the bell crank 266 moves rearwardly, it moves the shaft A52 and immersion roll A45 rearwardly therewith out of engagement with the lower squeeze roll A46. Immediately upon the lower or substantially vertical arm of the bell crank 266 engaging the abutment screw 277, further rotational movement thereof is limited and the continued upward movement of the piston rod 270 will cause the entire arm 251 to move upwardly therewith about the pivot rod 252 to substantially the position shown in Figure 17.

Figure 17:
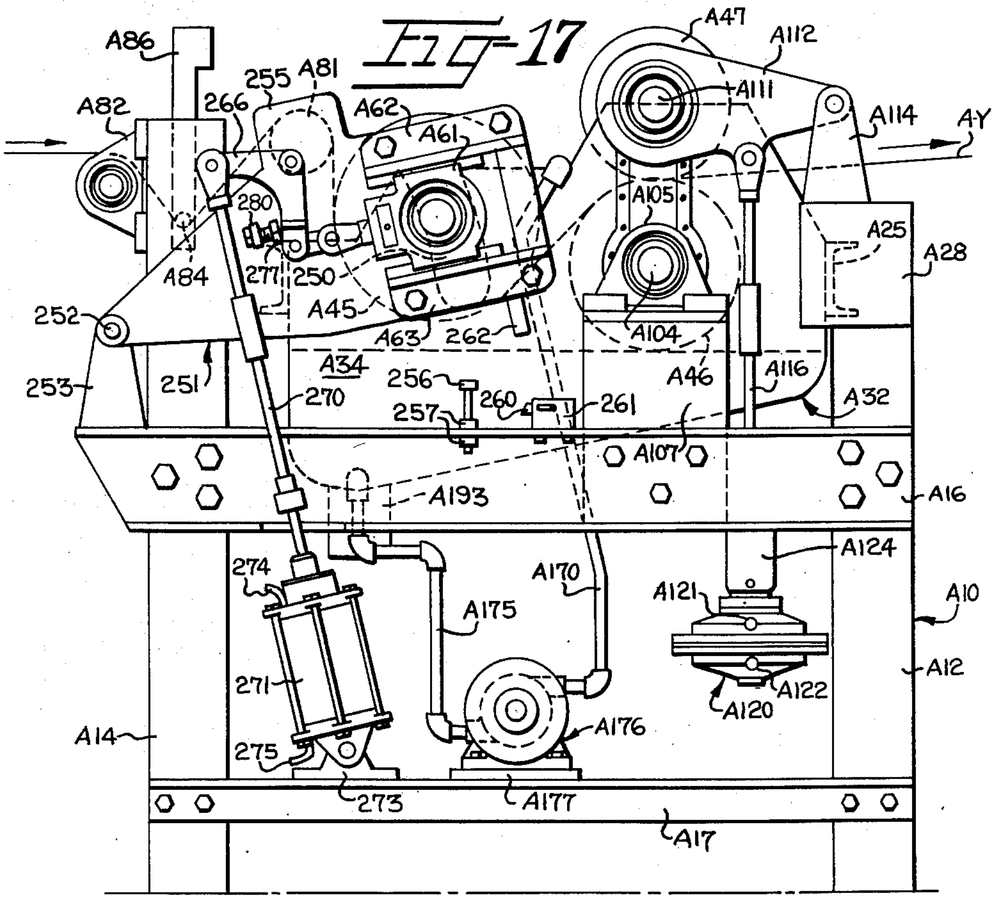
Figure 17 is a view similar to Figure 15, but showing some of the parts in a different position.
Figure 18:
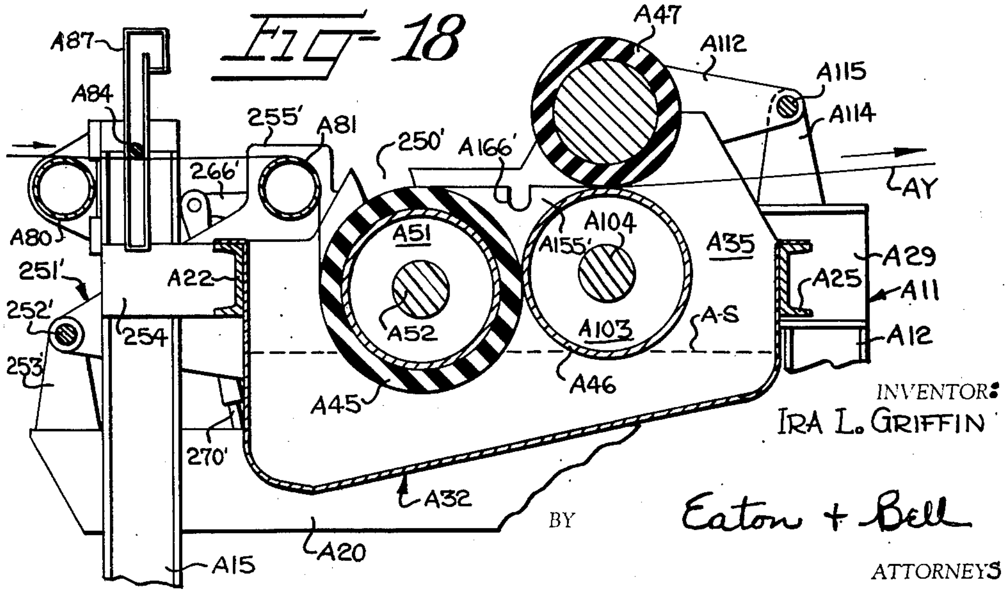
Figure 18 is a schematic longitudinal vertical sectional view taken substantially along the line 18—18 in Figure 16.
Figure 19:
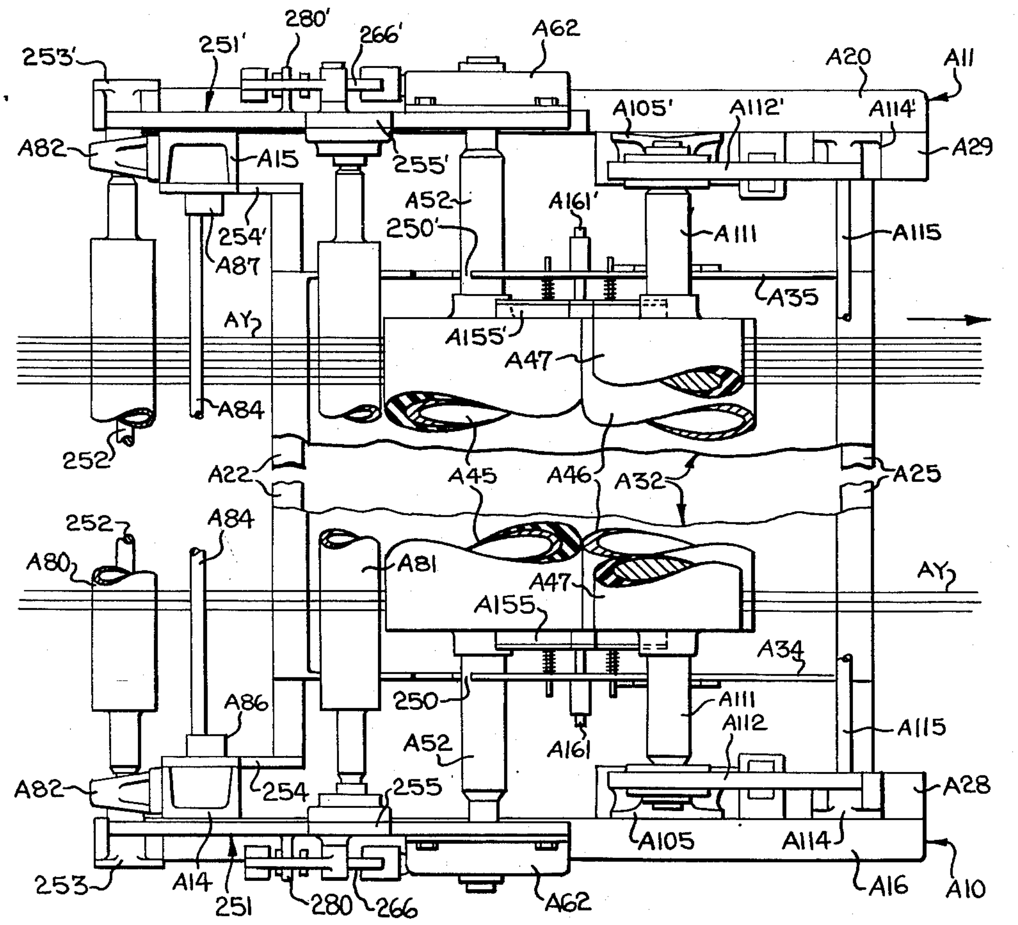
Figure 19 is a top plan view of the structure shown in Figure 15, with the central portion thereof broken away.
Figure 20:
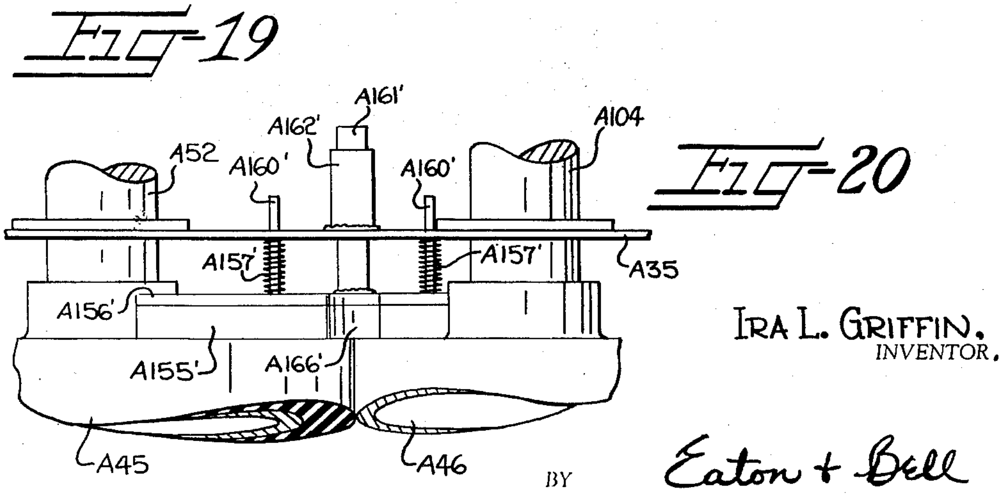
Figure 20 is an enlarged plan view similar to the upper central portion of Figure 5, showing, particularly, the closure for one end of the valley formed between the upper portion of the immersion roll and the lower squeeze roll.

Thus, the immersion roll A45 is not only moved rearwardly out of engagement with the lower squeeze roll A46, but is also moved upwardly clear of the sizing solution A—S, as shown in Figure 17, to thereby facilitate readily threading the yarns beneath the immersion roll A45 and also facilitating greater ease in cleaning the size box tank A32 as compared to the structure shown in Figure 4.

It is evident that, upon compressed air being directed to the upper ends of the cylinders 271 and exhausted from the lower ends thereof, the parts will move from the position shown in Figure 17 to that shown in Figure 15 and whereupon the compressed air in the cylinders 271 will cause the immersion roll A45 to be held in pressure engagement with the lower squeeze roll A46.

*Third form of means for controlling the position of the immersion roll relative to the lower squeeze roll*

Figure 21:
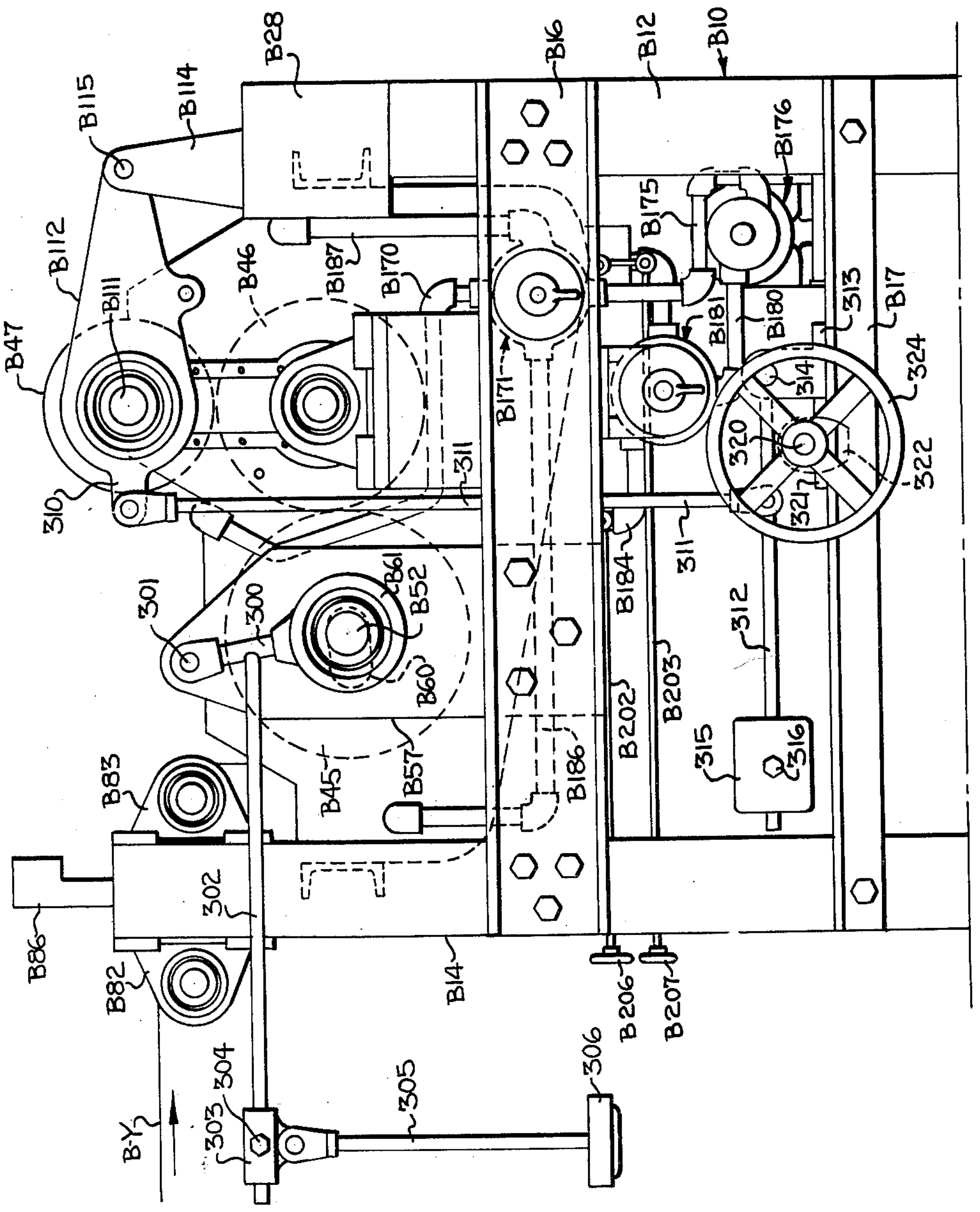
Figure 21 is another view similar to Figure 1, but showing still another form of means for applying pressure to the immersion roll relative to the lower squeeze roll.

In Figure 21, a third form of means for controlling the position of and effecting pressure on the immersion roll and a different form of means for applying pressure to the upper squeeze roll, from that shown in Figures 1 to 20, are illustrated. Since some of the parts shown in Figure 21 are identical to corresponding parts shown in Figures 1 to 14, inclusive, like reference characters will apply with the capital letter "B" prefixing each of the reference numerals to avoid repetitive description.

The structure shown in Figure 21 differs from that shown in Figures 1 to 20, inclusive, in that the guide members for the bearings, supporting opposite ends of the squeeze roll shaft B52, are omitted and, instead, the bearings supporting opposite ends of the squeeze roll shaft B52 are pivotally suspended, as will be presently described. Only one side of the size box is shown in Figure 21 and it is to be understood that the parts for supporting and applying pressure to the upper squeeze roll shaft B111 and the immersion roll shaft B52 are identical at the opposite side of the size box except being opposite hand. Accordingly, the parts at only one side of the size box in Figure 21 will be described and a description and illustration of the corresponding parts at the other side of the size box is deemed unnecessary in view of the many illustrations provided in Figures 1 to 20, inclusive.

Each of the bearings B61 differs from the bearings 61 and A61 in that it is fixed on the lower end of a pendulum or swing arm 300 which extends upwardly therefrom and is pivotally supported, as at 301, on the upper portion of the corresponding vertically disposed plate B57. The plate B57 is higher than the plate 57 in Figure 1 to accommodate the pivot 301, but is otherwise substantially the same as the plate 57 and has the substantially horizontal slot B60 therein through which the corresponding portion of the immersion roll shaft B52 extends.

The front end of a weight arm 302 is suitably secured to the medial portion of each pendulum or swing arm 300 and extends rearwardly therefrom, preferably substantially beyond the leg B14. An adjustable cuff member 303 is suitably adjustably secured on the weight arm 302, as by a set screw 304, and the upper end of a rod 305 is pivotally connected to the cuff member 303 and depends therefrom. The arm 305 has a suitable weight member or members 306 suitably secured to the lower end thereof. It is evident that as many weight members as desired may be positioned upon the weight member 306 and it is thus seen that the downward pressure exerted on the arm 302 by the weight member 306 causes the corresponding pendulum or swing arm 300 to tend to move in a counter-clockwise direction in Figure 21, thereby causing the immersion roll B45 to press against the lower squeeze roll B46.

The means for applying pressure to the upper squeeze roll B47 differs from that shown in Figures 1 to 20, although it is to be understood that the same type of pressure applying means may be used in association with all of the upper squeeze rolls 47, A47 and B47. In Figure 21, the cover means for the size box tanks is omitted, but a cover means of the type shown in Figure 1 may be provided, if desired. The parts for supporting opposite ends of the upper squeeze roll shaft B111 (Figure 21) may be identical at both sides of the machine and, therefore, only parts at one side of the machine will be described.

The arm B112 in Figure 21 differs from the arm 112 shown in Figure 1 in that, instead of a piston rod or plunger being connected to the medial portion of the arm B112, the rear or free end of the arm B112 has a projection 310 integral therewith to which the upper end of a link 311 is pivotally connected. The lower end of the link 311 is pivotally connected intermediate the ends of a lever or weight arm 312, one end of which is pivotally supported by the frame B110. In this instance, each of the lower longitudinal frame members, including the frame member B17, has a bearing block 313 fixed thereon which pivotally supports opposite ends of a shaft 314 and to which the front ends of the weight arms 312 are suitably secured, only one of the weight arms 312 being shown in Figure 21. The rear end of the arm 312 has a suitable weight member 315 adjustably secured thereon, as by a set screw 316. A transversely extending shaft 320 is rotatably mounted in bearings 321 secured to said lower longitudinal frame members and has a pair of irregularly shaped cams 322 fixed thereon. The cams 322 are in vertical alignment with the respective weight arms 312 and, when the high part of the cam 322 is turned upwardly by rotating a handwheel 324 fixed on one end of the shaft 320, the weight arms 312 are caused to be raised and, through intervening connections, will raise the top roll B47.

It is thus seen that the weight member 315 may be adjusted longitudinally of the weight arm 312 to vary the amount of downward pressure applied to the upper squeeze roll B47 against the lower squeeze roll 46. The upper roll B47 may also be moved away from the squeeze roll B46 by the cams 322 and held in raised position while changing yarn sets or for cleaning purposes.

It is thus seen that I have provided an improved yarn sizing apparatus for slashers including a size box tank having a partition therein forming the tank into two compartments, namely, an operating compartment and a storage compartment and wherein an improved arrangement of rolls is provided in the size box 10. This roll arrangement includes an immersion roll of relatively large diameter having its lower portion below the axis or shaft thereof immersed in the sizing solution and three forms of means are shown for applying pressure to the immersion roll to cause the same to normally bear in pressing engagement against a lower squeeze roll whose lower portion is merely in contacting engagement with the level of the sizing solution disposed in the operating compartment of the size box tank. Further, I have provided two forms of means for applying downward pressure to the upper squeeze roll disposed in the operating compartment and causing the same to bear in pressing engagement against the upper surface of the lower squeeze roll.

Another feature of the invention heretofore described lies in the formation of the relatively large valley between the upper proximal portions of the immersion roll and the lower squeeze roll in each of the forms of the invention as a result of the relatively large size of the immersion roll. Means are also provided for either closing or opening opposite ends of the valley formed between the upper proximal portions of the immersion and the squeeze roll so that, when the valley is not being utilized for applying additional sizing solution to a sheet of yarns after it has passed upwardly between the nip of the immersion roll and the lower squeeze roll, the closure means for opposite ends of the valley may be opened to permit the excess sizing solution to flow off of the ends of the immersion roll and the lower squeeze roll and back into the operating compartment of the size box tank.

Another feature incorporated in the present invention is the unique means for transferring the sizing solution from either compartment to the other and, further, for transferring the sizing solution from either compartment to the valley formed between the upper proximal portions of the immersion roll and the lower squeeze roll. In the latter instance, the closure means at opposite ends of the valley would be in closed position and would resiliently press against opposite ends of the immersion roll and the lower squeeze roll thereby permitting rotational movement of the immersion roll and the lower squeeze roll while still being effective to prevent the sizing solution from leaking from said valley other than by overflowing the closure means, thereby insuring that a second application of sizing solution is provided for the sheet of yarns before it has completed its course through the size box and also wherein the sizing solution applied to the sheet of yarn in the valley is squeezed therefrom by the upper and lower squeeze rolls.

I have also provided means for limiting the level of the sizing solution in the operating compartment to insure that ample space is provided between the nip of the immersion roll and the lower squeeze roll and the level of the sizing solution to permit air to escape from the sheet of yarn as the excess sizing solution is squeezed therefrom and wherein any excess sizing solution in the operating compartment will flow into the storage compartment.

There are also provided automatic means independently maintaining the sizing solution in both compartments at proper operating temperature and manually operable means to prevent the steam from escaping from steam coils utilized in maintaining the sizing solution at the proper operating temperature into either of the compartments of the size box tank when so desired, such as during the cleaning of either of the compartments while sizing solution is stored in the other of the compartments.

Another feature of the present invention is the provision of the fan or blower means at the egress opening of the size box tank for directing slow moving currents of air into the egress opening to be discharged through the ingress opening at which the sheet of yarn enters the closed size box tank. As heretofore stated, this prevents excessive steam from escaping from the egress opening and preheats and partially saturates the yarns before they contact the immersion roll.

The most important features of the present invention reside in the relative size of the immersion roll and the lower squeeze roll so the nip thereof is spaced sufficiently above the level of the sizing solution so the air is squeezed from the yarns after they have passed above the level of the sizing solution thereby preventing the solution from swelling or foaming excessively. As a matter of fact, if the nip of any two rolls is disposed below the level of the sizing solution, with or without yarns passing between the nip of the rolls, air bubbles are formed in the sizing solution due to the agitation thereof at the nip of the rolls and this also causes the sizing solution to foam and raises the level thereof. Of course, the slight agitation caused by the lower portion of the immersion roll in the improved arrangement embodied in the invention does cause sufficient agitation of the sizing solution to cause a slight swelling thereof and the storage compartment of the improved size box tank provides means for storing the excess sizing solution as it overflows the opening provided in the partition in the two compartments. Excessive swelling or foaming of the sizing solution is detrimental to the proper application of the sizing material to the yarns since it is evident that, as the percentage of air in the sizing solution increases, the percentage at which the yarns are saturated decreases although the yarns may be completely immersed in the sizing solution.

To my knowledge, the herein disclosed apparatus embodies a unique method of applying sizing solution in that, once the sheet of yarns engages the immersion roll, it does not move out of contact with the rolls until the sizing application is completed; that is, until the sheet of yarns leaves the nip of the upper and lower squeeze rolls, thus maintaining the yarns in perfect parallelization throughout movement through size box.

In the drawings and specifications there has been set forth a preferred embodiment of the invention and, although specific terms are employed, they are used in a generic and descriptive sense only and not for purposes of limitation, the scope of the invention being defined in the claims.

I claim:

1. In a size box having a tank for containing a supply of heated sizing solution and at least one driven squeeze roll disposed within said tank; the combination of an immersion roll in pressure contacting engagement with the squeeze roll and disposed in substantial parallel relationship thereto, means for maintaining the sizing solution at a predetermined level, the relative size and position of the squeeze roll and the immersion roll being such that the lower portion of the immersion roll is submerged in the sizing solution to a greater extent than the lower portion of the squeeze roll, and the nip of the squeeze roll and immersion roll being spaced substantially above the level of the sizing solution.

2. In a size box having a tank adapted to contain a supply of heated sizing solution and at least one set of driven upper and lower squeeze rolls disposed within said tank and between which a sheet of yarns is moved; the combination of an immersion roll disposed in contacting engagement with the rear surface of the lower squeeze roll relative to the direction of travel of said yarns and beneath which said yarns are adapted to pass, means normally maintaining the immersion roll in pressure engagement with the lower squeeze roll, said immersion roll being of greater diameter than the lower squeeze roll, and the lower portion of the immersion roll being disposed on a substantially lower level than the lower surface of the lower squeeze roll.

3. In a size box having a tank provided with side walls and being adapted to contain a supply of heated size solution, and at least one set of driven upper and lower squeeze rolls disposed within said tank and between which a sheet of yarns is moved; the combination of an immersion roll provided with a resilient covering and being disposed in contacting engagement with the rear surface of the lower squeeze roll relative to the direction of travel of said yarns and beneath which said yarns are adapted to pass, means normally maintaining the immersion roll in pressure engagement with the lower squeeze roll, said immersion roll being of a greater diameter than the lower squeeze roll and the lower portion of the immersion roll being disposed on a substantially lower level than the lower surface of the lower squeeze roll.

4. In a size box having a tank through which a sheet of yarns is adapted to pass and also having a driven lower squeeze roll over which the yarns subsequently pass and thence out of the size box and wherein said tank is adapted to contain a supply of sizing solution; the combination of an immersion roll disposed in advance of, and in parallel relation to, the lower squeeze roll, means normally maintaining the immersion roll in pressure engagement with the lower squeeze roll, said immersion roll being of greater diameter than the lower squeeze roll and having its lower surface disposed at a level substantially below the level of the lower surface of the lower squeeze roll.

5. The combination with a size box having a tank into which a sheet of yarns is adapted to pass and also having a driven lower squeeze roll over which the yarns subsequently pass and thence out of the size box and wherein said tank is adapted to contain a supply of sizing solution, of an immersion roll disposed in advance of, and in parallel relation to the lower squeeze roll, means normally maintaining the immersion roll in pressure engagement with the lower squeeze roll, said immersion roll being of greater diameter than the lower squeeze roll and having its upper surface disposed on a level substantially the same as that of the upper surface of the lower squeeze roll and having its lower surface disposed on a level substantially below the level of the lower surface of the lower squeeze roll.

6. In a size box having a tank for containing a supply of sizing solution, means for maintaining the sizing solution at a constant level and upper and lower driven squeeze rolls between which a sheet of yarns is adapted to pass; the combination of an immersion roll disposed in advance of and extending parallel to the lower squeeze roll, means for maintaining the immersion roll in pressure engagement with the lower squeeze roll, said immersion roll being so arranged relative to the lower squeeze roll that the nip thereof is spaced substantially above the normal level of the sizing solution and so the lower surface of the immersion roll is disposed on a level substantially below that of the level of the lower surface of the lower squeeze roll whereby the sheet of yarns may pass partially around and beneath the immersion roll in advance of their passing upwardly beneath the nip of the immersion roll and the lower squeeze roll.

7. A structure according to claim 6 wherein the levels of the immersion roll and the lower squeeze roll are such that the lower portion of the immersion roll is substantially immersed in the sizing solution and the lower surface of the lower squeeze roll barely touches the upper surface of the sizing solution thereby forming an air escapement spaced between the lower proximal portions of the immersion roll and the lower squeeze roll.

8. In a size box having a tank provided with side walls and being adapted to contain a supply of heated sizing solution, at least one set of upper and lower squeeze rolls disposed within said tank and between which a sheet of yarns is moved; the combination of an immersion roll disposed in contacting engagement with the rear surface of the lower squeeze roll relative to the direction of travel of said yarns and beneath which said yarns are adapted to pass, said immersion roll being of a greater diameter than the lower squeeze roll, the lower portion of the immersion roll being disposed on a substantially lower level than the lower surface of the lower squeeze roll, a shaft on which said immersion roll is fixedly mounted, movable bearings disposed exteriorly of said side walls and in which said tank is rotatably mounted, and means for applying pressure to said bearings to cause said immersion roll to engage the lower squeeze roll under pressure.

9. In a size box haxing a tank through which a sheet of yarns is passed and said tank being adapted to contain a supply of sizing solution, means for maintaining the sizing solution at a predetermined level and an upper and a lower driven squeeze roller disposed within said tank; the combination of an immersion roll disposed in advance of and in contacting engagement with the rear surface of the lower squeeze roll and beneath which the sheet of yarns is passed in advance of passing successively between the nip of the immersion roll and the squeeze roll and the nip of the upper and lower squeeze rolls, means normally maintaining the immersion roll in pressure engagement with the lower squeeze roll, the axes of the immersion roll and the lower squeeze roll being spaced substantially above the level of the sizing solution, the lower surface of the lower squeeze roll being in touching engagement with the sizing solution and the lower portion of the immersion roll being immersed in the sizing solution a substantially greater amount than the lower surface of the lower squeeze roll.

10. In a structure according to claim 9, bearings disposed externally of the tank for rotatably supporting the lower squeeze roll and the immersion roll.

11. In a structure according to claim 10, means for applying pressure to the bearings supporting the immersion roll to cause the immersion roll to bear in pressure engagement against the lower squeeze roll.

12. In a size box having a tank provided with side walls and respective front and rear walls and being adapted to contain a supply of heated sizing solution, a frame supporting said tank, said tank having a yarn ingress opening adjacent its rear wall and a yarn egress opening adjacent its front wall and at least one set of driven upper and lower squeeze rolls disposed within said tank; the combination of an immersion roll disposed between the lower squeeze roll and the rear wall of said tank and engaging the rear surface of said lower squeeze roll, fluid pressure operated means maintaining the immersion roll in pressure engagement with the squeeze roll, and the lower portion of the immersion roll being disposed at a substantially lower elevation than the lower surface of the lower squeeze roll.

13. In a yarn sizing apparatus having a tank for containing a supply of sizing solution and also having at least one set of upper and lower driven squeeze rolls between which yarns are passed; the combination of an immersion roll provided with a resilient covering and disposed within said tank, said immersion roll being disposed rearwardly of the lower squeeze roll relative to the direction of travel of said yarns, means for applying forward pressure to the immersion roll to cause the same to press against the lower squeeze roll, means for maintaining the sizing solution at a predetermined level substantially the same as the level of the lower surface of the lower squeeze roll, the lower portion of the immersion roll being substantially lower than the lower surface of the lower squeeze roll and the nip of the immersion roll and the lower squeeze roll being spaced substantially above the level of the sizing solution to thereby provide an air space between the lower proximal portions of the immersion roll and the squeeze roll whereby said yarns, in their course to the squeeze rolls, may pass downwardly beneath and upwardly about the lower portion of the immersion roll and the air will be squeezed from the yarns at the nip of the immersion roll and the lower squeeze roll to prevent swelling of the sizing solution.

14. In a size box having a tank provided with side walls and respective front and rear walls and being adapted to contain a supply of heated sizing solution, a frame supporting said tank, said tank having a yarn ingress opening adjacent its rear wall and a yarn egress opening adjacent its front wall and at least one set of driven upper and lower squeeze rolls disposed within said tank; the combination of an immersion roll disposed between the lower squeeze roll and the rear wall of said tank and engaging the rear surface of said lower squeeze roll, fluid pressure operated means maintaining the immersion roll in pressure engagement with the squeeze roll, said immersion roll being of a diameter substantially the same as that of the lower squeeze roll, the lower portion of the immersion roll being disposed at a substantially lower elevation than the lower surface of the lower squeeze roll, and means for maintaining the sizing solution at a level such that the lower surface of the lower squeeze roll barely touches the sizing solution and the lower portion of the immersion roll is substantially submerged in the sizing solution.

15. In a structure according to claim 14, means for supporting the immersion roll comprising bearing members disposed exteriorly of said side walls of said tank, means supporting said bearing members for movement substantially radially of the axis of the lower squeeze roll, a shaft on which said immersion roll is mounted, said side walls being provided with slots through which opposite ends of said shaft extend, opposite ends of said shaft being mounted in said bearing members, a resilient sealing plate secured to each of the side walls and also secured to said shaft to prevent vapors and sizing solution from escaping from said tank around the shaft, fluid pressure operated means connected to each of said bearing members, and manually operable means for selectively rendering said fluid pressure operated means operable toward and away from the lower squeeze roll whereby, at times, said bearing members will cause the immersion roll to bear in pressure engagement with the rear surface of the lower squeeze roll and, at other times, will cause the immersion roll to be withdrawn from engagement with the lower squeeze roll.

16. In a structure according to claim 14, means for supporting the immersion roll comprising bearing members disposed exteriorly of said side walls of said tank, means supporting said bearing members for movement substantially radially of the axis of the lower squeeze roll, a shaft on which said immersion roll is mounted, said side walls being provided with slots through which opposite ends of said shaft extend, opposite ends of said shaft being mounted in said bearing members, fluid pressure operated means connected to each of said bearing members, and manually operable means for selectively rendering said fluid presure operated means operable toward and away from the lower squeeze roll whereby, at times, said bearing members will cause the immersion roll to bear in pressure engagement with the rear surface of the lower squeeze roll and, at other times, will cause the immersion roll to be withdrawn from engagement with the lower squeeze roll.

17. In a structure according to claim 14, a shaft on which said immersion roll is fixedly mounted, opposite end portions of said shaft loosely extending through the respective side walls of said tank, bearing blocks mounted for substantially horizontal movement on said frame and in which opposite ends of the said shaft are rotatably mounted, a cylinder assembly carried by said frame and disposed in spaced substantially horizontal relationship to each of said bearing blocks, manually operable means for selectively admitting fluid under pressure to either end of said cylinder assemblies, and a piston rod extending from each of said cylinder assemblies to the corresponding bearing block whereby, upon admitting fluid under pressure to one end of said cylinder assemblies, the bearing blocks and the immersion roll will be urged under pressure toward the lower squeeze roll and, whereby, upon fluid pressure being admitted to the other ends of said cylinder assemblies, the immersion roll will be moved away from, and out of engagement with, the lower squeeze roll.

18. In a structure according to claim 14, a shaft on which said immersion roll is fixedly mounted and being disposed substantially above the normal level of the sizing solution, said shaft loosely extending through said side walls of the tank, a liquid seal means provided at the junctures of the side walls with said shaft, bearing members in which opposite ends of said shaft are rotatably mounted and being disposed exteriorly of said tank, a swing arm fixed at its lower end to each of said bearing members, the upper end of each swing arm being pivotally supported by said frame, a weight arm fixed at one end thereof to the medial portion of each swing arm and a weight member adjustably secured to each of said weight arms and being disposed remote from the lower squeeze roll relative to the immersion roll to thereby cause the immersion roll to bear against the lower squeeze roll under pressure.

19. In a structure according to claim 14, a shaft on which said immersion roll is fixedly mounted and being disposed substantially above the normal level of the sizing solution, said shaft loosely extending through said side walls of the tank, bearing members in which opposite ends of said shaft are rotatably mounted and being disposed exteriorly of said tank, a swing arm fixed at its lower end to each of said bearing members, the upper end of each swing arm being pivotally supported by said frame, a weight arm fixed at one end thereof to the medial portion of each swing arm and a weight member adjustably secured to each of said weight arms and being disposed remote from the lower squeeze roll relative to the immersion roll to thereby cause the immersion roll to bear against the lower squeeze roll under pressure.

20. In a structure according to claim 14, a shaft on which said immersion roll is fixedly mounted, said side walls each having a slot therein through which the corresponding end portion of the shaft loosely extends, each of said slots curving upwardly and rearwardly from the shaft and relative to the lower squeeze roll, a pair of pivoted arms pivotally mounted on said frame at a point remote from the lower squeeze roll relative to said shaft, bearing blocks mounted for longitudinal movement on said pivoted arms and in which opposite ends of said shaft are rotatably mounted, means limiting downward movement of said arms, each of said bell cranks having a pair of arms disposed in substantially right angular relationship to each other, one of the arms of each bell crank extending substantially horizontally and rearwardly and the other extending downwardly from the pivot point of the bell crank, a link connecting the rear end of each bearing block to the latter corresponding bell crank arm, a cylinder assembly pivotally connected to said frame at a point spaced beneath each of said pivoted arms, each of said cylinder assemblies having a piston rod movably mounted therein, the upper end of each piston rod being pivotally connected to the rear end of the substantially horizontal arm of the corresponding bell crank, means for selectively admitting fluid under pressure to opposite ends of each of the cylinder assemblies whereby, upon admitting fluid under pressure to the lower ends of said cylinder assemblies, said piston rods will move upwardly causing the corresponding bell cranks to rotate therewith for moving the bearing blocks away from said lower squeeze roll, means on each pivoted arm for limiting movement of each bearing block away from the lower squeeze roll whereby further upward movement of the piston rods cause the corresponding pivoted arms to move upwardly therewith and whereby, upon admitting fluid under pressure to the upper ends of the cylinder assemblies, the bearing blocks will be urged toward the lower squeeze roll for maintaining the immersion roll in pressure engagement with the rear surface of the lower squeeze roll.

21. In a size box having a tank adapted to contain a supply of sizing solution, upper and lower driven squeeze rolls disposed within said tank and between which a sheet of yarns is adapted to pass; the combination of an immersion roll of relatively large diameter disposed in pressure engagement with the rear surface of the lower squeeze roll, a partition in said tank dividing the same into an operating compartment and a storage compartment, all of said rolls being disposed within said operating compartment, said partition having an overflow opening therein whose lower wall is disposed on a level slightly above the level of the lower surface of the lower squeeze roll, the lower surface of the immersion roll being disposed substantially below the level of the lower surface of the lower squeeze roll whereby said overflow opening will maintain the sizing solution in the operating compartment at such a level that the lower surface of the lower squeeze roll will barely contact the sizing solution and the lower portion of the immersion roll will be substantially immersed in the sizing solution, and the nip of the immersion roll and the lower squeeze roll being spaced substantially above the level of the sizing solution.

22. In a structure according to claim 21, pipe connections between said compartments, a pump interposed in said pipe connections, manually operable valve means interposed in the pipe connections and being so arranged as to pump sizing solution from either of the compartments into the other of the compartments.

23. In a size box for sizing yarn strands and having a tank in which the yarn strands are trained in sheet form through a sizing bath from which the sized sheet is withdrawn through squeeze rolls; the combination of a transverse insulated partition disposed within said tank and forming said tank into an operating compartment and a storage compartment, said squeeze rolls being disposed within the operating compartment, means for selectively emptying the contents of either compartment into the other of the compartments, means for maintaining the sizing bath at a uniform temperature in each of said compartments, and a cover enclosing the storage compartment to substantially prevent vapors from escaping from the storage compartment.

24. That method of applying sizing solution to a sheet of yarns which includes directing the sheet of yarns into contacting engagement with an immersion roll in advance of the yarns entering the sizing solution, maintaining the immersion roll in pressure contact with a squeeze roll, maintaining the yarns in snug engagement with the immersion roll throughout their movement through the sizing solution and squeezing excess sizing solution from the yarns at the nip of the immersion and squeeze rolls while the yarns are still in engagement with the immersion roll, but after the yarns have passed out of the sizing solution.

25. That method of applying sizing solution to a sheet of yarns, wherein an immersion roll and a pair of squeeze rolls are employed, which includes maintaining the yarns in snug engagement with the immersion roll during and after passage of the yarns through the sizing solution, passing the yarns from the immersion roll to a succeeding squeeze roll in pressure contact with the immersion roll while said yarns are simultaneously in engagement with the immersion roll and the latter squeeze roll at the nip thereof, and thereafter maintaining the yarns in snug engagement with the latter squeeze roll until they pass between the nip of the squeeze rolls.

26. That method of applying sizing solution to a sheet of yarns, wherein upper and lower squeeze rolls and an immersion roll are employed, which includes directing the sheet of yarns to the immersion roll from a point above the immersion roll, maintaining the sheet of yarns in engagement with the periphery of the immersion roll at a point in advance of the yarns being immersed in the sizing solution, maintaining said sheet of yarns in engagement with the immersion roll throughout their movement through the sizing solution and also substantially after the yarns have passed out of the sizing solution, and squeezing the excess sizing solution from the sheet of yarns after they have passed through the sizing solution and while the yarns are still in contact with the immersion roll by urging the immersion roll into pressure contact with the lower squeeze roll whereby said sheet of yarns is passed through an air escapement space prior to the excess sizing solution being squeezed therefrom.

27. That method of applying sizing solution to a sheet of yarns, wherein upper and lower squeeze rolls and an immersion roll are employed, which includes directing the sheet of yarns to the immersion roll from a point above the immersion roll, maintaining the sheet of yarns in engagement with the periphery of the immersion roll at a point in advance of the yarns being immersed in the sizing solution, maintaining said sheet of yarns in engagement with the immersion roll throughout their movement through the sizing solution and also substantially after the yarns have passed out of the sizing solution, squeezing the excess sizing solution from the sheet of yarns after they have passed through the sizing solution and while the yarns are still in contact with the immersion roll, then passing the yarns through another supply of sizing solution while maintaining the yarns in snug engagement with the squeeze roll last employed in squeezing the excess solution from the yarns, and then again squeezing the excess solution from the yarns after the yarns have passed beyond the other supply of solution and while the yarns are still in snug engagement with the last-named squeeze roll.

28. That method of applying sizing solution to a sheet of yarns which includes passing the sheet through a bath of sizing solution while maintaining the sheet in contact with a first roll partially immersed in the bath, squeezing excess solution from the sheet after the sheet has passed through the bath while still maintaining the sheet in contact with the first roll by pressing the first roll against a second roll, passing the sheet from the first roll onto the second roll, and then again squeezing excess solution from the sheet while the sheet is still in contact with the second roll.

29. That method of applying sizing solution to a sheet of yarns which includes passing the sheet through a first bath of sizing solution while maintaining the sheet in contact with a first roll partially immersed in the first bath, squeezing excess solution from the sheet after the sheet has passed through the first bath while still maintaining the sheet in contact with the first roll by pressing the first roll against a second roll, passing the sheet from the first roll onto the second roll, subjecting the sheet to a second bath while maintaining the sheet in contact with the second roll, and then again squeezing excess solution from the sheet while the sheet is still in contact with the second roll.

30. In a size box having a tank for containing a supply of heated sizing solution and at least one driven squeeze roll disposed within said tank; the combination of an immersion roll in contacting pressure engagement with the squeeze roll and disposed in substantially horizontal parallel relationship thereto, means for maintaining the sizing solution at a predetermined level, the relative size and position of the squeeze roll and the immersion roll being such that the lower portion of the immersion roll is submerged in the sizing solution to a greater extent than the lower portion of the squeeze roll, the nip of the squeeze roll and immersion roll being spaced substantially above the level of the sizing solution and at least one of said rolls being covered with a resilient material on the periphery thereof.

31. In a yarn sizing apparatus having a tank for containing a supply of sizing solution and also having at least one set of upper and lower driven squeeze rolls between which yarns are passed; the combination of an immersion roll disposed within said tank, said immersion roll being disposed rearwardly of the lower squeeze roll relative to the direction of travel of said yarns, means for applying forward pressure to the immersion roll to cause the same to press against the lower squeeze roll, means for maintaining the sizing solution at a predetermined level substantially the same as the level of the lower surface of the lower squeeze roll, and the nip of the immersion roll and the lower squeeze roll being spaced substantially above the level of the sizing solution to thereby provide an air space between the lower proximal portions of the immersion roll and the squeeze roll whereby said yarns, in their course to the squeeze roll, may pass downwardly beneath and upwardly about the lower portion of the immersion roll and the air will be squeezed from the yarns at the nip of the immersion roll and the lower squeeze roll to prevent swelling of the sizing solution.

32. In a yarn sizing apparatus having a tank for containing a supply of sizing solution and also having at least one set of upper and lower driven squeeze rolls between which yarns are passed; the combination of an immersion roll disposed within said tank, said immersion roll being disposed rearwardly of the lower squeeze roll relative to the direction of travel of said yarns, means for applying forward pressure to the immersion roll to cause the same to press against the lower squeeze roll, means for maintaining the sizing solution at a predetermined level whereby the lower portions of the immersion roll and the lower squeeze roll are at least partially submerged in the sizing solution, and the nip of the immersion roll and the lower squeeze roll being spaced substantially above the level of the sizing solution to thereby provide an air space between the lower proximal portions of the immersion roll and the squeeze roll whereby said yarns, in their course to the squeeze roll, may pass downwardly beneath and upwardly about the lower portion of the immersion roll and the air will be squeezed from the yarns, along with the excess sizing solution, at the nip of the immersion roll and the lower squeeze roll to prevent swelling of the sizing solution.

References Cited in the file of this patent

UNITED STATES PATENTS

| | | |
|---|---|---|
| 189,838 | Briggs | Apr. 24, 1877 |
| 1,608,342 | Selley | Nov. 23, 1926 |

(Other references on following page)

UNITED STATES PATENTS

| | | |
|---|---|---|
| 1,822,425 | Sussmuth | Sept. 8, 1931 |
| 2,093,294 | Tant | Sept. 14, 1937 |
| 2,108,189 | Batchelder | Feb. 15, 1938 |
| 2,194,937 | Hawkins | Mar. 26, 1940 |
| 2,461,090 | Smith et al. | Feb. 8, 1949 |
| 2,478,230 | Bouvet | Aug. 9, 1949 |
| 2,564,725 | Rusca | Aug. 21, 1951 |
| 2,568,446 | Griffin | Sept. 18, 1951 |
| 2,572,904 | Bauer | Oct. 30, 1951 |
| 2,643,436 | Rockoff | June 30, 1953 |
| 2,664,616 | Smith | Jan. 5, 1954 |

FOREIGN PATENTS

| | | |
|---|---|---|
| 683 | Great Britain | of 1872 |
| 1,569 | Great Birtain | of 1874 |
| 8,974 | Great Britain | of 1887 |
| 16,249 | Great Britain | of 1892 |
| 5,466 | Switzerland | May 24, 1892 |